United States Patent
Droz et al.

(10) Patent No.: US 10,379,540 B2
(45) Date of Patent: Aug. 13, 2019

(54) LIGHT DETECTION AND RANGING (LIDAR) DEVICE HAVING MULTIPLE RECEIVERS

(71) Applicant: Waymo LLC, Mountain View, CA (US)

(72) Inventors: Pierre-Yves Droz, Los Altos, CA (US); Caner Onal, Palo Alto, CA (US); William McCann, San Francisco, CA (US); Bernard Fidric, Cupertino, CA (US); Vadim Gutnik, Mountain View, CA (US); Laila Mattos, Dallas, TX (US); Rahim Pardhan, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 192 days.

(21) Appl. No.: 15/295,619

(22) Filed: Oct. 17, 2016

(65) Prior Publication Data
US 2018/0107221 A1 Apr. 19, 2018

(51) Int. Cl.
*G01S 7/491* (2006.01)
*G01S 17/89* (2006.01)
(Continued)

(52) U.S. Cl.
CPC ............ *G05D 1/024* (2013.01); *G01S 7/4813* (2013.01); *G01S 7/4816* (2013.01); *G01S 7/4817* (2013.01);
(Continued)

(58) Field of Classification Search
CPC ...... G01S 17/89; G01S 7/4911; G01S 7/4912; G05D 1/0088; G05D 1/024
See application file for complete search history.

(56) References Cited

U.S. PATENT DOCUMENTS

| 7,544,945 B2 | 6/2009 | Tan | |
|---|---|---|---|
| 8,818,609 B1 * | 8/2014 | Boyko | ........... B60W 30/00 342/70 |

(Continued)

OTHER PUBLICATIONS

Velodyne LIDAR, Inc., "User's Manual and Programming Guide, Firmware Version 4.07" for High Definition LiDAR™ Sensor, models HDL-64E S2 and S2.1.
(Continued)

*Primary Examiner* — Jerrah Edwards
(74) *Attorney, Agent, or Firm* — McDonnell Boehnen Hulbert & Berghoff LLP

(57) ABSTRACT

Described herein is a LIDAR device that may include a transmitter, first and second receivers, and a rotating platform. The transmitter may be configured to emit light having a vertical beam width. The first receiver may be configured to detect light at a first resolution while scanning the environment with a first FOV and the second receiver may be configured to detect light at a second resolution while scanning the environment with a second FOV. In this arrangement, the first resolution may be higher than the second resolution, the first FOV may be at least partially different from the second FOV, and the vertical beam width may encompass at least a vertical extent of the first and second FOVs. Further, the rotating platform may be configured to rotate about an axis such that the transmitter and first and second receivers each move based on the rotation.

20 Claims, 15 Drawing Sheets

(51) Int. Cl.
*G05D 1/02* (2006.01)
*G05D 1/00* (2006.01)
*G01S 17/02* (2006.01)
*G01S 17/42* (2006.01)
*G01S 17/93* (2006.01)
*G01S 7/481* (2006.01)
*G01S 13/93* (2006.01)

(52) U.S. Cl.
CPC ........... *G01S 7/4818* (2013.01); *G01S 7/4911* (2013.01); *G01S 13/931* (2013.01); *G01S 17/023* (2013.01); *G01S 17/42* (2013.01); *G01S 17/89* (2013.01); *G01S 17/936* (2013.01); *G05D 2201/0213* (2013.01)

(56) References Cited

U.S. PATENT DOCUMENTS

| | | | |
|---|---|---|---|
| 9,239,959 B1 | 1/2016 | Evans | |
| 9,285,464 B2* | 3/2016 | Pennecot | G01S 17/89 |
| 9,329,269 B2* | 5/2016 | Zeng | G01S 17/58 |
| 9,425,654 B2 | 8/2016 | Lenius | |
| 2010/0020306 A1 | 1/2010 | Hall | |
| 2012/0170029 A1 | 7/2012 | Azzazy et al. | |
| 2013/0131908 A1 | 5/2013 | Gerard et al. | |
| 2013/0242285 A1* | 9/2013 | Zeng | G01S 17/58 356/28 |
| 2014/0293263 A1 | 10/2014 | Justice et al. | |
| 2015/0055117 A1* | 2/2015 | Pennecot | G01S 17/89 356/4.01 |
| 2015/0192676 A1 | 7/2015 | Kotelnikov et al. | |
| 2015/0219764 A1 | 8/2015 | Lipson | |
| 2016/0274222 A1 | 9/2016 | Msotek | |
| 2016/0282468 A1 | 9/2016 | Gruver | |

OTHER PUBLICATIONS

International Search Report and Written Opinion for corresponding PCT application No. PCT/US2017/056568, dated Jan. 18, 2018.

* cited by examiner

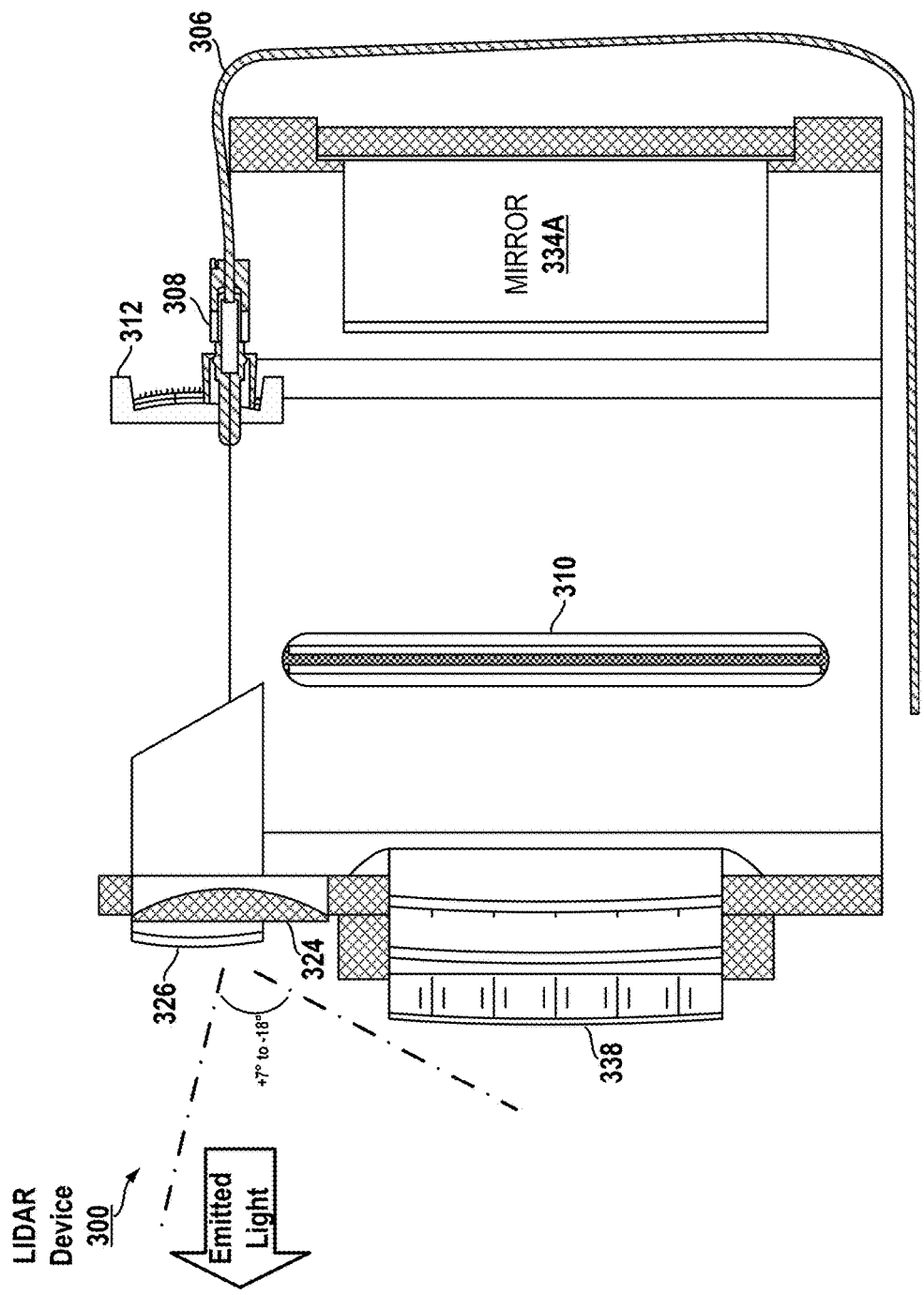

LIGHT DETECTION AND RANGING (LIDAR) DEVICE HAVING MULTIPLE RECEIVERS

BACKGROUND

A vehicle can be configured to operate in an autonomous mode in which the vehicle navigates through an environment with little or no input from a driver. Such an autonomous vehicle can include one or more sensors that are configured to detect information about the environment in which the vehicle operates. One such sensor is a light detection and ranging (LIDAR) device.

A LIDAR device can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse.

With this arrangement, a LIDAR device may thus include a laser, or set of lasers, that can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

SUMMARY

Example implementations may relate to a LIDAR device that includes at least a transmitter, first and second receivers, and a rotating platform. The transmitter may be configured to emit, into the environment, light having a vertical beam width and having wavelengths in a wavelength range, and the first and second receivers may each be configured to respectively detect light having wavelengths in the wavelength range. The rotating platform may be configured to rotate about an axis such that the transmitter, the first receiver, and the second receiver each respectively move relative to the environment based on rotation of the rotating platform.

In accordance with the present disclosure, the first and second receivers may be arranged to scan the environment at different resolutions compared to one another and/or with different fields of view (FOVs) compared to one another. In some examples, the first receiver may be configured to detect light at a first resolution while scanning the environment with a first field of view (FOV), and the second receiver may be configured to detect light at a second different resolution while scanning the environment with a second different FOV. Furthermore, LIDAR device could be arranged such that the vertical beam width of the emitted light encompasses at least a vertical extent of the first and second FOVs.

The disclosed LIDAR device could be used in various arrangements and for various purposes. For example, the disclosed LIDAR device may be positioned at a top side of the vehicle that is opposite to a bottom side on which one or more wheels of the vehicle are positioned. With this arrangement, a controller may operate the vehicle based at least on the scans of the environment received from the LIDAR device. Other examples are possible as well.

In one aspect, a LIDAR device is provided. The LIDAR device may include a transmitter, where the transmitter is configured to emit light having a vertical beam width into an environment, the emitted light having wavelengths in a wavelength range. The LIDAR device may also include a first receiver, where the first receiver is configured to detect light at a first resolution while scanning the environment with a first FOV, and where the first receiver is configured to detect light having wavelengths in the wavelength range. The LIDAR device may additionally include a second receiver, where the second receiver is configured to detect light at a second resolution while scanning the environment with a second FOV, where the second receiver is configured to detect light having wavelengths in the wavelength range, where the first resolution is higher than the second resolution, where the first FOV is at least partially different from the second FOV, and where the vertical beam width encompasses at least a vertical extent of the first and second FOVs. The LIDAR device may further include a rotating platform, where the rotating platform is configured to rotate about an axis, and where the transmitter, the first receiver, and the second receiver are each configured to respectively move relative to the environment based on rotation of the rotating platform.

In another aspect, a vehicle is provided. The vehicle may include one or more wheels positioned at a bottom side of the vehicle and a LIDAR device positioned at a top side of the vehicle opposite to the bottom side. The LIDAR device may include a transmitter and first and second receivers, where the transmitter is configured to emit light having a vertical beam width into an environment around the vehicle, the emitted light having wavelengths in a wavelength range, where the first receiver is configured to detect light at a first resolution while scanning the environment with a first FOV, the detected light having wavelengths in the wavelength range, where the second receiver is configured to detect light at a second resolution while scanning the environment with a second FOV, the detected light having wavelengths in the wavelength range, where the first resolution is higher than the second resolution, where the first FOV is at least partially different from the second FOV, and where the vertical beam width encompasses at least a vertical extent of the first and second FOVs. Further, the vehicle may include a controller configured to operate the vehicle based at least on scans of the environment by the first and second receivers of the LIDAR device.

In yet another aspect, a method is provided. The method may involve receiving, by a controller from a LIDAR device that includes a transmitter and first and second receivers, scans of an environment around a vehicle, where the transmitter is configured to emit light having a vertical beam width into the environment, the emitted light having wavelengths in a wavelength range, where the first receiver is configured to detect light at a first resolution while scanning the environment with a first FOV, the detected light having wavelengths in the wavelength range, where the second receiver is configured to detect light at a second resolution while scanning the environment with a second FOV, the detected light having wavelengths in the wavelength range, where the first resolution is higher than the second resolution, where the first FOV is at least partially different from the second FOV, and where the vertical beam width encompasses at least a vertical extent of the first and second FOVs. The method may also involve operating the vehicle, by the controller, based at least on the scans of the environment received from the LIDAR device.

In yet another aspect, a system is provided. The system may include means for receiving, from a LIDAR device that includes a transmitter and first and second receivers, scans of an environment around a vehicle, where the transmitter is configured to emit light having a vertical beam width into the environment, the emitted light having wavelengths in a wavelength range, where the first receiver is configured to detect light at a first resolution while scanning the environment with a first FOV, the detected light having wavelengths in the wavelength range, where the second receiver is configured to detect light at a second resolution while scanning the environment with a second FOV, the detected light having wavelengths in the wavelength range, where the first resolution is higher than the second resolution, where the first FOV is at least partially different from the second FOV, and where the vertical beam width encompasses at least a vertical extent of the first and second FOVs. The system may also include means for operating the vehicle based at least on the scans of the environment received from the LIDAR device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3B shows another cross-sectional illustration of a side view of a LIDAR device, according to an example embodiment.

DETAILED DESCRIPTION

Figure 1:
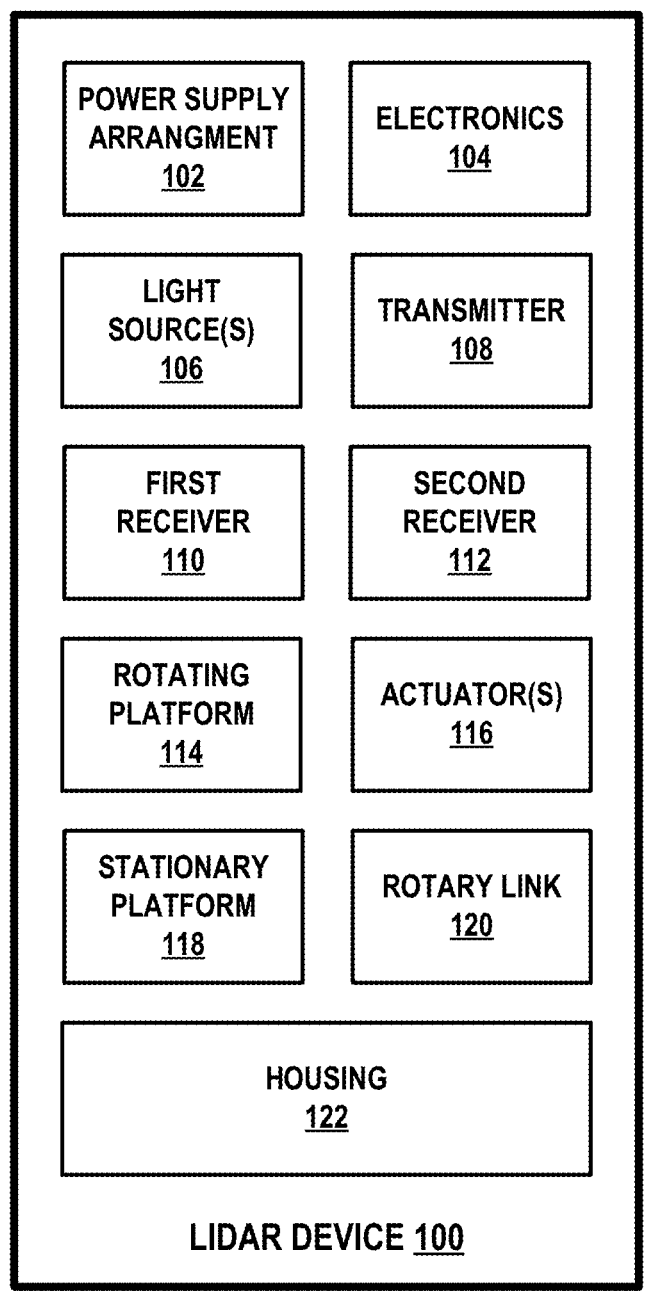
FIG. 1 is a simplified block diagram of a LIDAR device, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

There are continued efforts to improve vehicle safety and/or autonomous operation, including the development of vehicles equipped with accident-avoidance systems and remote sensing capabilities. Various sensors, such as a LIDAR device, may be included in a vehicle to detect obstacles or objects in an environment of the vehicle and thereby facilitate accident avoidance and/or autonomous operation, among other options.

In some instances, a mounting position and/or configuration of a LIDAR device may be undesirable for some object detection/identification scenarios and/or for other reasons. For instance, a LIDAR device positioned at a top side of the vehicle may have a 360° horizontal FOV (e.g., by rotating the LIDAR device), but may not detect objects near the vehicle due to the geometry of the LIDAR device positioned at the top side of the vehicle. In another instance, a LIDAR device that is scanning a wide FOV for a scanning duration may provide a lower angular resolution 3D map of the environment than a similar LIDAR device that is scanning a narrower FOV over the same scanning duration. The lower resolution, for example, may be sufficient for identifying medium range objects (e.g., within a threshold distance to the vehicle), but may be insufficient to identify long range objects (e.g., outside the threshold distance). Further, adjusting the scanning duration may affect a refresh rate of the LIDAR device (i.e., rate at which the LIDAR device scans the entire FOV). On one hand, a high refresh rate may allow the LIDAR device to quickly detect changes in the FOV (e.g., moving objects, etc.). On the other hand, a low refresh rate may allow the LIDAR device to provide higher resolution data.

To help resolve such challenges, disclosed herein is a LIDAR device having architecture with which the LIDAR device can obtain information for different portions of the environment respectively at different resolutions. Although the LIDAR device is described herein in the context of being used on a vehicle, the LIDAR device disclosed herein may be used for various purposes and may be incorporated on or otherwise connected to any feasible system or arrangement. Nonetheless, the LIDAR device may be used on any type of vehicle, including conventional automobiles and automobiles having an autonomous mode of operation. However, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

More specifically, the disclosed LIDAR device may include a transmitter that houses an optical path for directing light from a light source (e.g., a high power fiber laser) and out of a transmit lens towards the environment. Generally, that emitted light may have wavelengths in a certain wavelength range (e.g., 1525 nm to 1565 nm) and may take the form of emitted laser beams, among other possibilities. Moreover, the transmitter may include a diffuser to spread the light along a vertical axis, such as with a spread of +7° away from a horizontal axis to −18° away from the horizontal axis, for instance. This arrangement may result in laser beams having horizontal beam width that is significantly narrower than a vertical beam width of the laser beams. In practice, such horizontally-narrow laser beams may help avoid interference between beams reflected off a reflective object and beams reflected off a less-reflective object that is horizontally adjacent to the reflective object, which may ultimately help the LIDAR device distinguish between those objects.

Additionally, the LIDAR device may include at least first and second receivers each respectively configured to detect light having wavelengths in the above-mentioned wavelength range. According to the present disclosure, the first receiver may be configured to detect light (e.g., using a first array of photodetectors) at a first resolution and the second receiver may be configured to detect light (e.g., using a second array of photodetectors) at a second resolution, with the first resolution being higher than the second resolution. Moreover, each such receiver may be configured to scan the environment with a different FOV. For example, the first receiver may include an optical lens arrangement or the like so as to focus incoming light within a range of +7° away from the above-mentioned horizontal axis to −7° away from the above-mentioned horizontal axis, and the second receiver may include an optical lens arrangement or the like so as to focus incoming light within a range of −7° away from the above-mentioned horizontal axis to −18° away from the above-mentioned horizontal axis. In this way, the vertical beam width of the emitted light may encompass at least a vertical extent of the first and second FOVs, thereby allowing the LIDAR device to provide data for a relatively larger portion of the environment. Other examples are also possible.

Furthermore, the LIDAR device may include a stationary platform as well as a rotating platform. In particular, the rotating platform may be coupled to the stationary platform via a rotary link and may be configured to rotate about an axis relative to the stationary platform. In doing so, the rotary platform may also cause the transmitter, the first receiver, and the second receiver to each respectively move relative to the environment, thereby allowing the LIDAR device to horizontally obtain information for various portions of the environment. Moreover, the stationary platform may be configured to be coupled (e.g., using any feasible connector arrangement) to a top side of a vehicle or other system or device.

In some implementations, the disclosed LIDAR device may be arranged such that (i) the first receiver is positioned substantially above the stationary platform, (ii) the second receiver and the transmitter are both positioned substantially above the first receiver, and (iii) the second receiver is positioned substantially horizontally adjacent to the transmitter. In practice, this particular arrangement may be advantageous for various reasons.

For instance, the stationary platform may be coupled to a top side of a vehicle that is opposite to a bottom side on which one or more wheels of the vehicle are positioned, and the rotary platform may be configured to rotate about a vertical axis that is substantially perpendicular to the top side of the vehicle. Additionally, the transmitter being positioned at a higher point as described above may allow the transmitter to emit light having the above-described vertical spread that substantially avoids reflect off the vehicle itself. Similarly, the second receiver also being positioned at that higher point as described above may allow the second receiver to detect light that is reflected off a portion of the environment that is relatively close to the vehicle.

In this regard, given the above example FOVs, the second receiver may have a FOV of a portion of the environment that is closer to the vehicle and the first receiver may have a FOV of a portion of the environment that is away from the vehicle. In this way, the first receiver may receive light reflected off objects that are further away from the vehicle and do so at a higher resolution, thereby providing greater detail to help with detection and/or recognition of those further objects. Further, the second receiver may receive light reflected off objects closer to the vehicle and do so at a lower resolution (i.e., compared to the resolution of the first receiver), which may provide sufficient detail to help with detection and/or recognition of those closer objects while allowing for reduction in sensor costs, power consumption, and/or data load, among other possibilities.

II. EXAMPLE ARRANGEMENT OF A LIDAR DEVICE

Referring now to the Figures, FIG. 1 is a simplified block diagram of a LIDAR device 100, according to an example embodiment. As shown, the LIDAR device 100 includes a power supply arrangement 102, electronics 104, light source(s) 106, a transmitter 108, a first receiver 110, a second receiver 112, a rotating platform 114, actuator(s) 116, a stationary platform 118, a rotary link 120, and a housing 122. In other embodiments, the LIDAR device 100 may include more, fewer, or different components. Additionally, the components shown may be combined or divided in any number of ways.

Power supply arrangement 102 may be configured to supply power to various components of the LIDAR device 100. In particular, the power supply arrangement 102 may include or otherwise take the form of at least one power source disposed within the LIDAR device 100 and connected to various components of the LIDAR device 100 in any feasible manner, so as to supply power to those components. Additionally or alternatively, the power supply arrangement 102 may include or otherwise take the form of a power adapter or the like that is configured to receive power from one or more external power sources (e.g., from a power source arranged in a vehicle to which the LIDAR device 100 is coupled) and to supply that received power to various components of the LIDAR device 100 in any feasible manner. In either case, any type of power source may be used such as, for example, a battery.

Electronics 104 may include one or more electronic components and/or systems each arranged to help facilitate certain respective operations of the LIDAR device 100. In practice, these electronics 104 may be disposed within the LIDAR device 100 in any feasible manner. For instance, at least some of the electronics 104 may be disposed within a central cavity region of the rotary link 120. Nonetheless, the electronics 104 may include various types of electronic components and/or systems.

For example, the electronics 104 may include various wirings used for transfer of control signals from a controller to various components of the LIDAR device 100 and/or for transfer of data from various components of the LIDAR device 100 to the controller. Generally, the data that the controller receives may include sensor data based on detections of light by the receivers 110-112, among other possibilities. Moreover, the control signals sent by the controller may operate various components of the LIDAR device 100, such as by controlling emission of light by the transmitter 106, controlling detection of light by the receivers 110-112, and/or controlling the actuator(s) 116 to rotate the rotating platform 112, among other possibilities.

In some arrangements, the electronics 104 may also include the controller at issue. This controller may have one or more processors, data storage, and program instructions stored on the data storage and executable by the one or more processor to facilitate various operations. With this arrangement, the controller may thus be configured to carry operation described herein, such as those of method 500 as described below. Additionally or alternatively, the controller may communicate with an external controller or the like (e.g., a computing system arranged in a vehicle to which the LIDAR device 100 is coupled) so as to help facilitate transfer of control signals and/or data between the external controller and the various components of the LIDAR device 100.

In other arrangements, however, the electronics 104 may not include the controller at issue. Rather, at least some of the above-mentioned wirings may be used for connectivity to an external controller. With this arrangement, the wirings may help facilitate transfer of control signals and/or data between the external controller and the various components of the LIDAR device 100. Other arrangements are possible as well.

Further, one or more light sources 106 can be configured to emit, respectively, a plurality of light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately between 1525 nm and 1565 nm. It is noted that this range is described for exemplary purposes only and is not meant to be limiting.

In accordance with the present disclosure, one of the light sources 106 may be a fiber laser that includes an optical amplifier. In particular, the fiber laser may be a laser in which an active gain medium (i.e., a source of optical gain within the laser) is in an optical fiber. Moreover, the fiber laser could be arranged in various ways within the LIDAR device 100. For instance, the fiber laser could be disposed between the rotating platform 114 and the first receiver 110.

As such, the present disclosure will be generally described herein in the context of a fiber laser being used as the primary light source 106. In some arrangements, however, the one or more light sources 106 may additionally or alternatively include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), and/or any other device configured to selectively transmit, reflect, and/or emit light to provide the plurality of emitted light beams and/or pulses.

In accordance with the present disclosure, transmitter 108 may be configured to emit light into an environment. In particular, the transmitter 108 may include an optical arrangement that is arranged to direct light from a light source 106 toward the environment. This optical arrangement may include any feasible combination of mirror(s) used to guide propagation of the light throughout physical space and/or lens(es) used to adjust certain characteristics of the light, among other optical components. For instance, the optical arrangement may include a transmit lens arranged to collimate the light, thereby resulting in light having rays that are substantially parallel to one another.

In some implementations, the optical arrangement may also include a diffuser arranged to spread the light along a vertical axis. In practice, the diffuser may be formed from glass or another material, and may be shaped (e.g., aspherical shape) to spread or otherwise scatter light in a particular manner. For instance, the vertical spread may be a spread of $+7°$ away from a horizontal axis to $-18°$ away from the horizontal axis (e.g., the horizontal axis ideally being parallel to a ground surface in the environment). Moreover, the diffuser may be coupled to a light source 106 in any direct or indirect manner, such as by being fused to an output end of the fiber laser for instance.

Thus, this implementation may result in laser beams or the like having horizontal beam width (e.g., 1 mm) that is significantly narrower than a vertical beam width of the laser beams. As noted, such horizontally-narrow laser beams may help avoid interference between beams reflected off a reflective object and beams reflected off a less-reflective object that is horizontally adjacent to the reflective object, which may ultimately help the LIDAR device 100 distinguish between those objects. Other advantages are possible as well.

Yet further, in some implementations, the optical arrangement may also include a dichroic mirror arranged to reflect at least a portion of the diffused light towards a thermal energy measurement device (not shown) of the LIDAR device 100, which could take the form of a thermopile for instance. With this implementation, the thermal energy measurement device could be arranged to measure energy of the light being emitted towards the environment. And data related to that energy measurement could be received by a controller and then used by the controller as basis for facilitating further operations, such as adjustments to intensity of the emitted light for example. Other implementations are also possible.

As noted, the LIDAR device 100 may include a first receiver 110 and a second receiver 112. Each such receiver may be respectively configured to detect light having wavelengths in the same wavelength range as the one of the light emitted from the transmitter 108 (e.g., 1525 nm to 1565 nm). In this way, the LIDAR device 100 may distinguish reflected light pulses originated at the LIDAR device 100 from other light in the environment.

In accordance with the present disclosure, the first receiver 110 may be configured to detect light with a first resolution and the second receiver 112 may be configured to detect light with a second resolution that is lower than the first resolution. For example, the first receiver 110 may be configured to detect light with a 0.036° (horizontal)×0.067° (vertical) angular resolution, and the second receiver 112 may be configured to detect light with a 0.036° (horizontal)× 0.23° (vertical) angular resolution.

Additionally, the first receiver 110 may be configured to scan the environment with a first FOV and the second receiver 112 may be configured to scan the environment with a second FOV that is at least partially different from the first FOV. Generally, this arrangement may allow the LIDAR device 100 to scan different portions of the environment respectively at different resolutions, which may be applicable in various situations as further discussed below.

Furthermore, the LIDAR device 100 may be arranged such that the vertical beam width of the emitted light encompasses at least a vertical extent of the first and second FOVs. For instance, the different FOVs of the receivers at issue may be at least partially different vertical FOVs that collectively allow for detection of light substantially along the same angular range as the above-mentioned vertical spread of the emitted light. With this arrangement, a controller may operate the LIDAR device 100 to emit a light (e.g., a laser beam) having the vertical beam width and the LIDAR device 100 may then detect reflected light at both the first and second receivers 110-112 along the vertical extent of the receivers' FOVs. In this manner, the LIDAR device 100 may provide data for a relatively larger portion of the environment and do so at a relatively faster rate.

In a specific example, the first receiver 110 may be arranged to focus incoming light within a range of +7° away from the above-mentioned horizontal axis to −7° away from the horizontal axis, and the second receiver 112 may be arranged to focus incoming light within a range of −7° away from the horizontal axis to −18° away from the horizontal axis. In this way, the first and second receivers 110-112 collectively allow for detection of light along a range of +7° to −18°, which matches the above-mentioned exemplary vertical spread of emitted light that the transmitter 108 provides. It is noted that these resolutions and FOVs are described for exemplary purposes only and are not meant to be limiting.

In an example implementation, the first and second receivers 110-112 may each have a respective optical arrangement that allows the receiver to provide the respective resolution and FOV as described above. Generally, each such optical arrangement may be arranged to respectively provide an optical path between at least one optical lens and a photodetector array.

In one implementation, the first receiver 110 may include an optical lens arranged to focus light reflected from one or more objects in the environment of the LIDAR device 100 onto detectors of the first receiver 110. To do so, the optical lens may have dimensions of approximately 10 cm×5 cm as well as a focal length of approximately 35 cm, for example. Moreover, the optical lens may be shaped so as to focus incoming light along a particular vertical FOV as described above (e.g., +7° to −7°). Such shaping of the first receiver's optical lens may take on one of various forms (e.g., spherical shaping) without departing from the scope of the present disclosure.

In this implementation, the first receiver 110 may also include at least one mirror arranged to fold the optical path between the at least one optical lens and the photodetector array. Each such mirror may be fixed within the first receiver 110 in any feasible manner. Also, any feasible number of mirrors may be arranged for purposes of folding the optical path. For instance, the first receiver 110 may also include two or more mirrors arranged to fold the optical path two or more times between the optical lens and the photodetector array. In practice, such folding of the optical path may help reduce the size of the first receiver, among other outcomes.

In another implementation, the first receiver 110 may include two or more optical lenses. For example, the first receiver 110 may include an outer spherically-shaped lens facing the environment as well as an inner cylindrically-shaped lens. In this example, incoming light may thus be focused onto a line on a focal plane. Other examples and implementations are possible as well.

Furthermore, as noted, the first receiver may have a photodetector array, which may include two or more detectors each configured to convert detected light (e.g., in the above-mentioned wavelength range) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner. For example, the photodetector array may include a 13×16 array of detectors. It is noted that this photodetector array is described for exemplary purposes only and is not meant to be limiting.

Generally, the detectors of the array may take various forms. For example, the detectors may take the form of photodiodes, avalanche photodiodes (e.g., geiger mode and/or linear mode avalanche photodiodes), phototransistors, cameras, active pixel sensors (APS), charge coupled devices (CCD), cryogenic detectors, and/or any other sensor of light configured to receive focused light having wavelengths in the wavelength range of the emitted light. Other examples are possible as well.

With regards to the second receiver 112, the second receiver 112 may also include at least one optical lens arranged to focus light reflected from one or more objects in the environment of the LIDAR device 100 onto detectors of the first receiver 110. To do so, the optical lens may have any dimensions, focal length, and shaping that help provide for focusing of incoming light along a particular vertical FOV as described above (e.g., −7° to −18°). In some implementations, the second receiver 112 may include one or more mirrors arranged to fold the optical path between the second receiver's optical lens and the second receiver's photodetector array. Further, the second receiver's photodetector array may include any feasible number of detectors arranged in any of the ways described above in the context of the first receiver 110. Other implementations are possible as well.

Further, as noted, the LIDAR device 100 may include a rotating platform 114 that is configured to rotate about an axis. In order to rotate in this manner, one or more actuators 116 may actuate the rotating platform 114. In practice, these actuators 116 may include motors, pneumatic actuators, hydraulic pistons, and/or piezoelectric actuators, among other possibilities.

In accordance with the present disclosure, the transmitter 108 and the first and second receivers 110-112 may be arranged on the rotating platform such that each of these components moves relative to the environment based on rotation of the rotating platform 114. In particular, each of these components could be rotated relative to an axis so that the LIDAR device 100 may obtain information from various directions. In this manner, the LIDAR device 100 may have a horizontal viewing direction that can be adjusted by actuating the rotating platform 114 to different directions.

With this arrangement, a controller could direct an actuator 116 to rotate the rotating platform 114 in various ways so as to obtain information about the environment in various ways. In particular, the rotating platform 114 could rotate at various extents and in either direction. For example, the rotating platform 114 may carry out full revolutions such that the LIDAR device 100 provides a 360° horizontal FOV of the environment. Thus, given that the first and second receivers 110-112 may both rotate based on rotation of the rotating platform 114, both receivers 110-112 may have the same horizontal FOV (e.g., 360°) while having different vertical FOV as described above.

Moreover, the rotating platform 114 could rotate at various rates so as to cause LIDAR device 100 to scan the environment at various refresh rates. For example, the LIDAR device 100 may be configured to have a refresh rate of 15 Hz (e.g., fifteen complete rotations of the LIDAR device 100 per second). In this example, assuming that the LIDAR device 100 is coupled to a vehicle as further described below, the scanning thus involves scanning a 360° FOV around the vehicle fifteen times every second. Other examples are also possible.

Yet further, as noted, the LIDAR device 100 may include a stationary platform 118. In practice, the stationary platform may take on any shape or form and may be configured for coupling to various structures, such as to a top of a vehicle for example. Also, the coupling of the stationary platform may be carried out via any feasible connector arrangement (e.g., bolts and/or screws). In this way, the LIDAR device 100 could be coupled to a structure so as to be used for various purposes, such as those described herein.

In accordance with the present disclosure, the LIDAR device 100 may also include a rotary link 120 that directly or indirectly couples the stationary platform 118 to the rotating platform 114. Specifically, the rotary link 120 may take on any shape, form and material that provides for rotation of the rotating platform 114 about an axis relative to the stationary platform 118. For instance, the rotary link 120 may take the form of a shaft or the like that rotates based on actuation from an actuator 116, thereby transferring mechanical forces from the actuator 116 to the rotating platform 114. Moreover, as noted, the rotary link may have a central cavity in which electronics 104 and/or one or more other components of the LIDAR device 100 may be disposed. Other arrangements are possible as well.

Yet further, as noted, the LIDAR device 100 may include a housing 122. In practice, the housing 122 may take on any shape, form, and material. For example, the housing 122 can be a dome-shaped housing, among other possibilities. In another example, the housing 122 may be composed of a material that is at least partially non-transparent, which may allow for blocking of at least some light from entering the interior space of the housing 122 and thus help mitigate thermal effects as further discussed below. It is noted that this housing is described for exemplary purposes only and is not meant to be limiting.

In accordance with the present disclosure, the housing 122 may be coupled to the rotating platform 114 such that the housing 122 is configured to rotate about the above-mentioned axis based on rotation of the rotating platform 114. With this implementation, the transmitter 108, the first and second receiver 110-112, and possibly other components of the LIDAR device 100 may each be disposed within the housing 122. In this manner, the transmitter 108 and the first and second receiver 110-112 may rotate along with this housing 122 while being disposed within the housing 122.

Moreover, the housing 122 may have an aperture formed thereon, which could take on any feasible shape and size. In this regard, the transmitter 108 could be arranged within the housing 120 so as to emit light into the environment through the aperture. In this way, the transmitter 108 may rotate along with the aperture due to corresponding rotation of the housing 120, thereby allowing for emission of light into various directions. Also, the first and second receiver 110-112 could each be respectively arranged within the housing 120 so as respectively detect light that enters the housing 120 from the environment through the aperture. In this way, the receivers 110-112 may rotate along with the aperture due to corresponding rotating of the housing 120, thereby allowing for detection of the light incoming from various directions along the horizontal FOV.

In practice, the housing 122 may be arranged as described above for various reasons. Specifically, due to various components of the LIDAR device 100 being disposed within the housing 122 and due to the housing 122 rotating along with those components, the housing 122 may help protect those components from various environmental hazards, such as rain and/or snow, among others. Also, if the housing 122 were to be stationary as the LIDAR device 100 rotates within the housing 122, then the housing 122 would likely be transparent so as to allow for propagation of light through the housing 122 and thus for scanning of the environment by the LIDAR device 100.

In accordance with the present disclosure, however, the housing 122 may have the aperture that rotates along with the LIDAR device 100, which means that the housing 122 does not necessarily need to be fully transparent to allow for scanning of the scanning of the environment. For example, the housing 122 could be composed of at least a partially non-transparent material, except for the aperture, which could be composed of a transparent material. As a result, the housing 122 may help mitigate thermal effects on the LIDAR device 100. For instance, the housing 122 may block sun rays from entering the interior space of the housing 122, which may help avoid overheating of various components of the LIDAR device 100 due to those sun rays. Other instances are possible as well.

Given the various components of the LIDAR device 100 as described above, these various components could be arranged in various ways. In accordance with the present disclosure, assuming that the LIDAR device 100 is spatially oriented such that the stationary platform 118 closest to a ground surface, the LIDAR device 100 may be arranged such that (i) the first receiver 110 is positioned substantially above the stationary platform 118, (ii) the second receiver 112 and the transmitter 108 are both positioned substantially above the first receiver 110, and (iii) the second receiver 112 is positioned substantially horizontally adjacent to the transmitter 108. As further discussed below, this particular arrangement may be advantageous for various reasons. However, it is noted that this arrangement is described for exemplary purposes only and is not meant to be limiting.

III. ILLUSTRATIVE IMPLEMENTATIONS OF THE LIDAR DEVICE

Figure 2A:
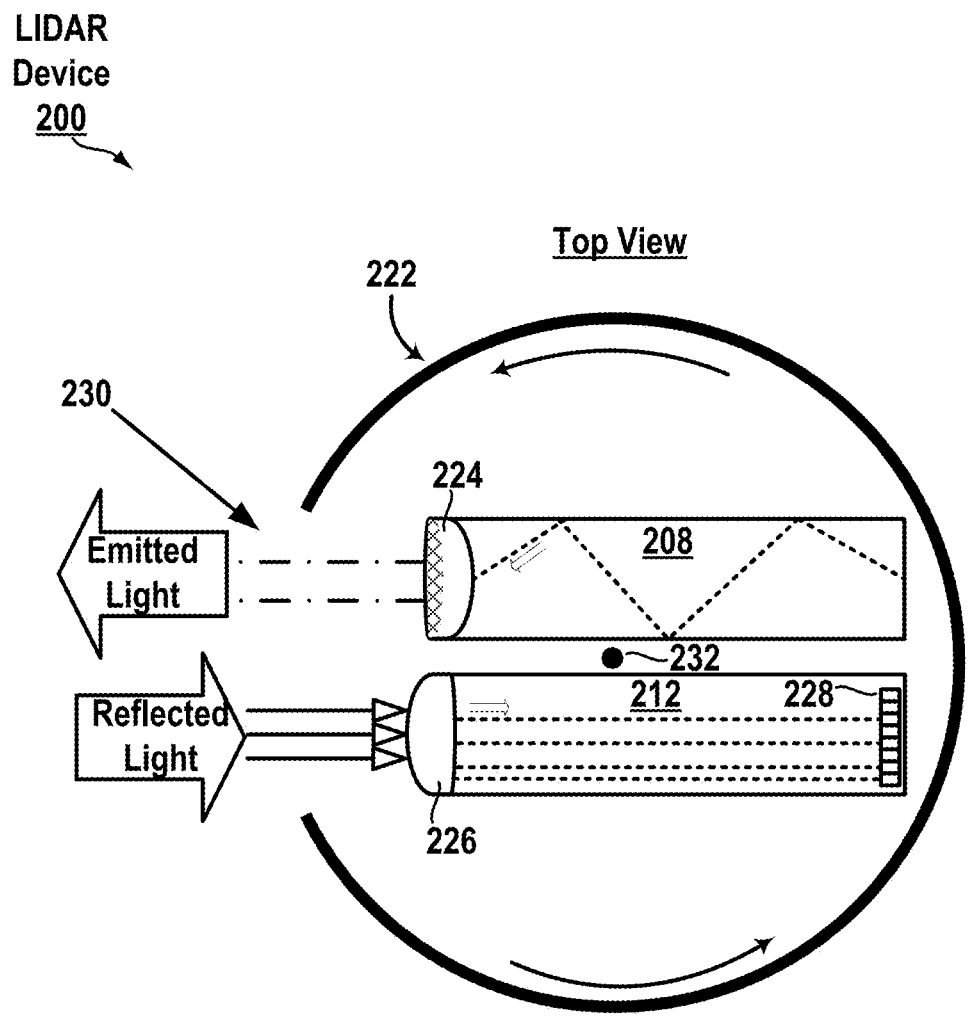
FIG. 2A shows a cross-sectional illustration of a top view of a LIDAR device, according to an example embodiment.
Figure 2B:
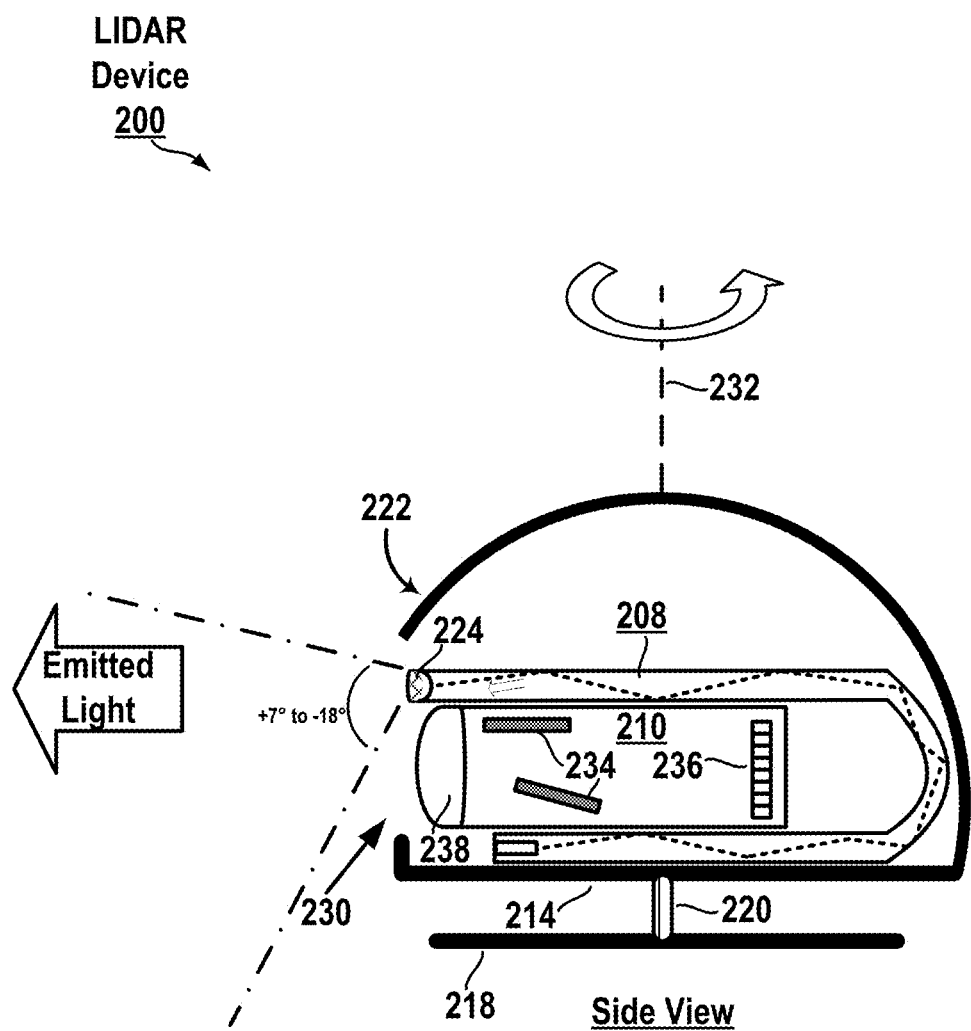
FIG. 2B shows a cross-sectional illustration of a side view of a LIDAR device, according to an example embodiment.
Figure 2C:
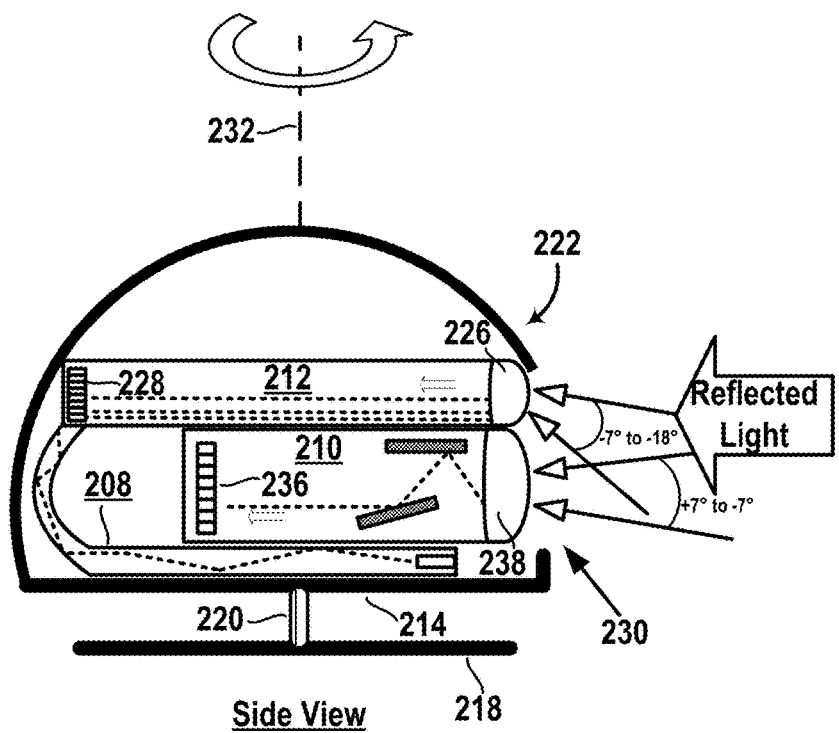
FIG. 2C shows a cross-sectional illustration of a different side view of a LIDAR device, according to an example embodiment.

FIGS. 2A to 2C next show an example set of illustrations of a LIDAR device having the features disclosed herein. In particular, FIG. 2A shows a top cross-sectional view of a LIDAR device 200, FIG. 2B shows a side cross-sectional view of the LIDAR device 200, and FIG. 2C shows a side cross-sectional view of the LIDAR device 200 that is opposite to the side view shown in FIG. 2B (e.g., such as a side view shown after half a revolution of the LIDAR device 200 about axis 232). It is noted that these illustrations are shown for exemplary purposes only and are not meant to be limiting.

More specifically, FIGS. 2A to 2C collectively illustrate that the LIDAR device 200 includes a housing 222 that is coupled to a rotating platform 214, in accordance with the discussion above. The rotating platform 214 is then shown as being coupled to a stationary platform 218 via a rotary link 220, also in accordance with the discussion above. With this arrangement, the rotating platform 214 may rotate about axis 232, thereby also causing rotation of the housing 222, a transmitter 208, a first receiver 210, and a second receiver 212 of the LIDAR device 200 about the axis 232.

In practice, the housing 222 could take the form of housing 122 described above. Also, the housing 222 is shown to include an aperture 230 through which light may be emitted into the environment and through which reflected light may enter from the environment. Further, FIGS. 2A to 2C collectively illustrate that the transmitter 208, the first receiver 210, and the second receiver 212 are each disposed within the housing 222, with the transmitter 208 being substantially adjacent to the second receiver 212 and with the transmitter and the second receiver 212 both being positioned above the first receiver 210.

More specifically, the transmitter 208 may take the form of transmitter 108 described above. As shown in FIGS. 2A and 2B, the transmitter 208 includes an optical lens 224 (e.g., a diffuser) fused with a fiber laser that acts as an optical amplifier, the fiber laser being at least partially positioned between the rotating platform 214 and the first receiver 210. And in accordance with the discussion above, the optical lens 224 may be arranged to vertically spread the emitted light along a particular vertical spread of +7° to −18°.

Additionally, the first receiver 210 may take the form of first receiver 110 described above. As shown in FIGS. 2B and 2C, the first receiver 210 includes an optical arrangement that provides an optical path between an optical lens 238 and a photodetector array 236. Specifically, the optical arrangement is shown to include two mirrors 234 arranged to fold the optical path twice between the optical lens 238 and the photodetector array 236, thereby helping reduce the size of the first receiver 210. In this regard, the optical lens 238 may be arranged to focus incoming light within a vertical FOV range of +7° to −7°. And in accordance with the discussion above, the photodetector array 236 may be configured to detect light at a 0.036° (horizontal)×0.067° (vertical) angular resolution.

Further, the second receiver 212 may take the form of second receiver 112 described above. As shown in FIGS. 2A and 2C, the second receiver 212 includes an optical arrangement that provides an optical path between an optical lens 226 and a photodetector array 228. In this regard, the optical lens 226 is shown as being arranged to focus incoming light within a vertical FOV range of −7° to −18°. And in accordance with the discussion above, the photodetector array 228 may be configured to detect light at a 0.036° (horizontal)×0.23° (vertical) angular resolution.

Figure 3A:
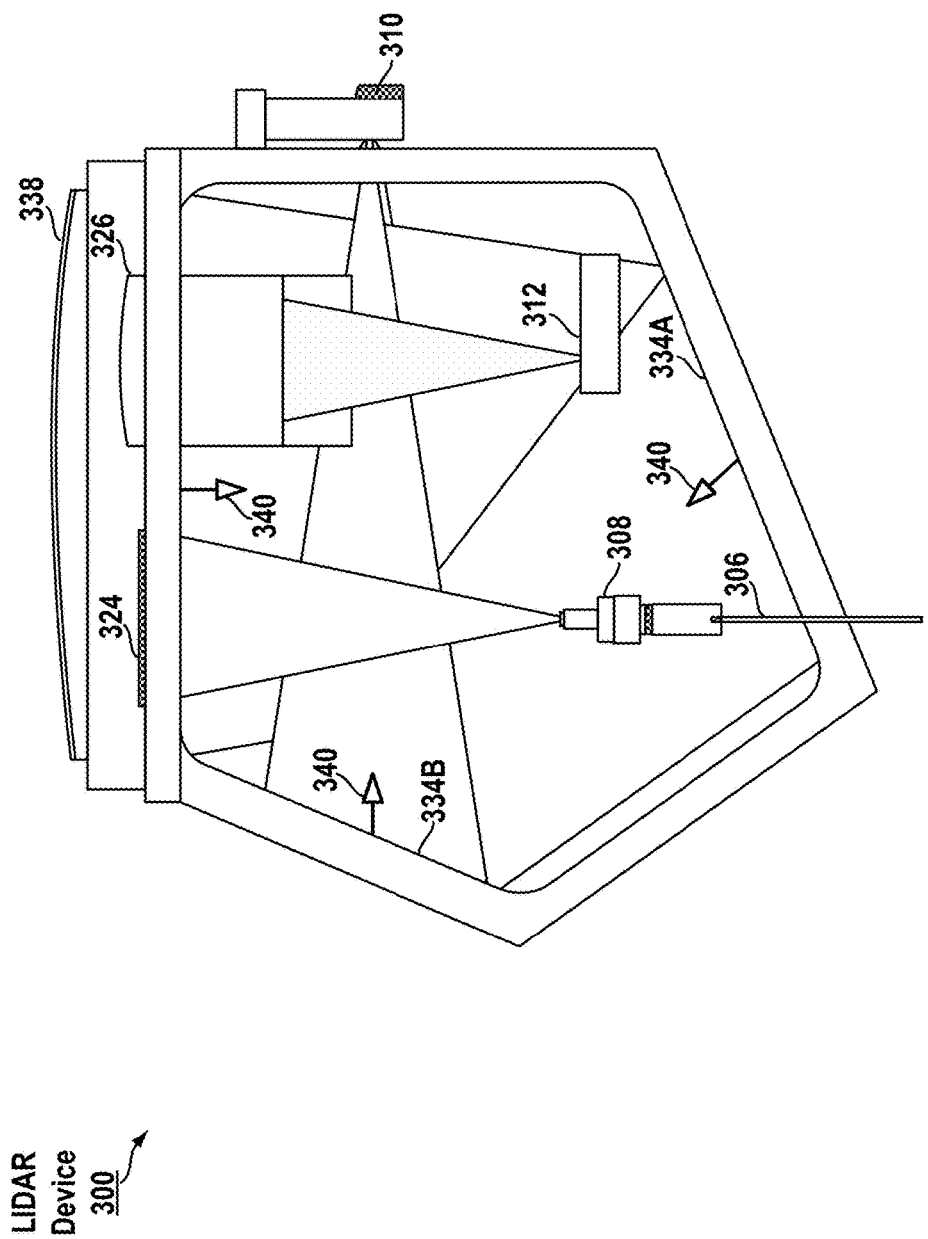
FIG. 3A shows another cross-sectional illustration of a top view of a LIDAR device, according to an example embodiment.
Figure 3C:
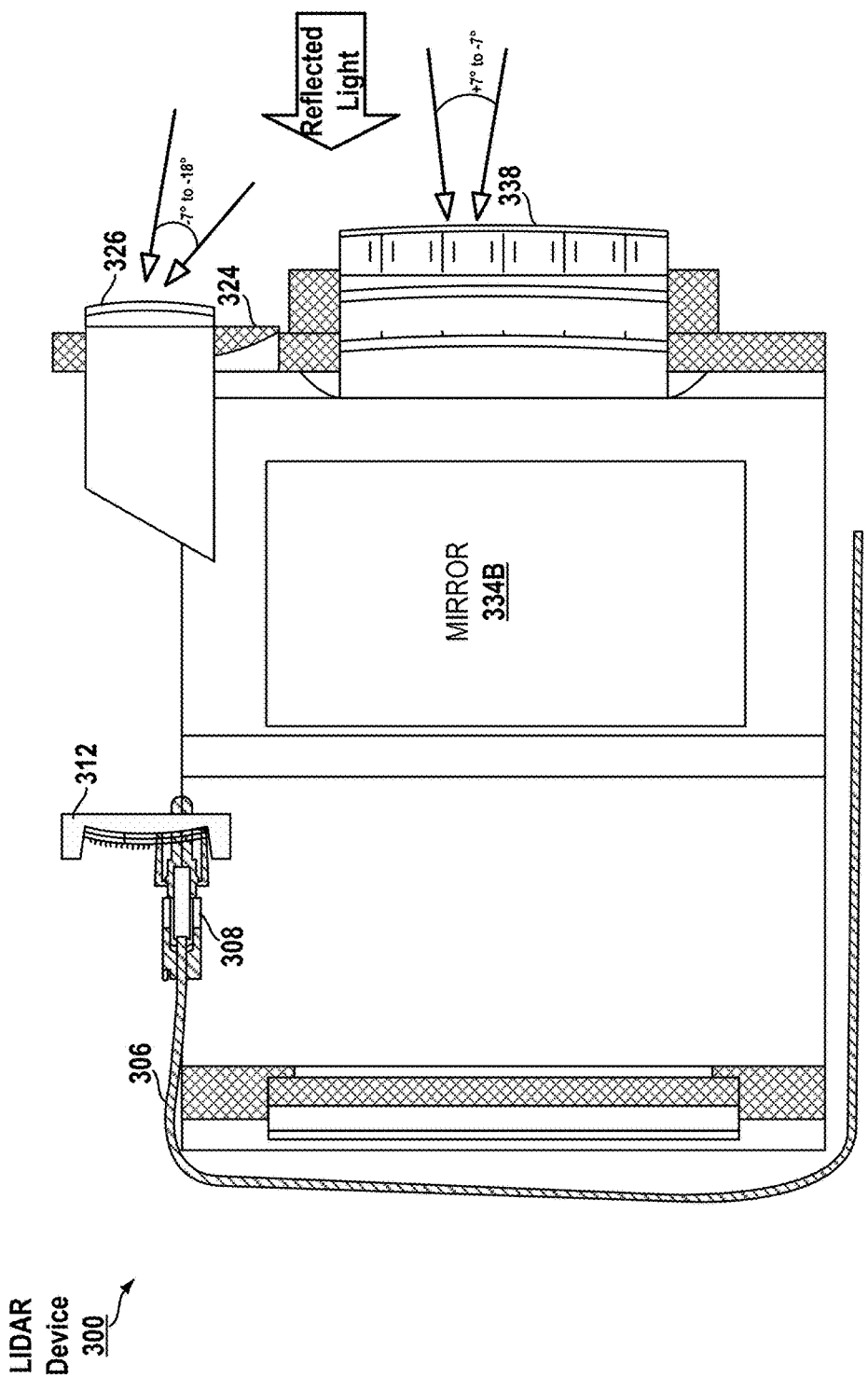
FIG. 3C shows another cross-sectional illustration of a different side view of a LIDAR device, according to an example embodiment.

FIGS. 3A to 3C next show another example set of illustrations of a LIDAR device having the features disclosed herein. In particular, FIG. 3A shows a top cross-sectional view of a LIDAR device 300, FIG. 3B shows a side cross-sectional view of the LIDAR device 300, and FIG. 3C shows a side cross-sectional view of the LIDAR device 300 that is opposite to the side view shown in FIG. 3B (e.g., such as a side view shown after half a revolution of the LIDAR device 300). It is noted that these illustrations are shown for exemplary purposes only and are not meant to be limiting.

More specifically, FIGS. 3A to 3C collectively illustrate that the LIDAR device 300 includes a transmitter 308, a first receiver 310, and a second receiver 312. Although not shown in these Figures, these various components may be disposed within a housing that may be coupled to a rotating platform, in accordance with the discussion above. The rotating platform may then be coupled to a stationary platform via a rotary link, also in accordance with the discussion above. With this arrangement, the rotating platform may rotate about an axis, thereby also causing rotation of the housing, the transmitter 308, the first receiver 310, and the second receiver 312 of the LIDAR device 300 about the axis. Further, FIGS. 3A to 3C collectively illustrate that the transmitter 308 is substantially adjacent to the second receiver 312 and that the transmitter 308 and the second receiver 312 are both positioned above the first receiver 310.

More specifically, the transmitter 308 may take the form of transmitter 108 described above. As shown in FIGS. 3A-3C, the transmitter 208 may emit light generated by a fiber laser 306 that acts as an optical amplifier. And in accordance with the discussion above, the transmitter 308 may emit the light through an optical lens 324 (e.g., a diffuser) arranged to vertically spread the emitted light along a particular vertical spread of +7° to −18°.

Additionally, the first receiver 310 may take the form of first receiver 110 described above. As shown in FIGS. 3A-3C, an optical arrangement may provide an optical path 340 between an optical lens 338 and a photodetector array (not shown) of the first receiver 310. Specifically, the optical arrangement is shown to include two mirrors 334A-334B arranged to fold the optical path 340 twice between the optical lens 338 and the photodetector array of the first receiver 310, thereby helping reduce the size of the LIDAR device 300. In this regard, the optical lens 338 may be arranged to focus incoming light within a vertical FOV range of +7° to −7°. And in accordance with the discussion above, the photodetector array of the first receiver 310 may be configured to detect light at a 0.036° (horizontal)×0.067° (vertical) angular resolution.

Further, the second receiver 312 may take the form of second receiver 112 described above. As shown in FIGS. 3A-3C, an optical arrangement may provide an optical path between an optical lens 326 and a photodetector array (not shown) of the second receiver 312. In this regard, the optical lens 326 is shown as being arranged to focus incoming light within a vertical FOV range of −7° to −18°. And in accordance with the discussion above, the photodetector array of the second receiver 312 may be configured to detect light at a 0.036° (horizontal)×0.23° (vertical) angular resolution. Other illustrations of the LIDAR device are possible as well.

FIGS. 4A to 4E next collectively illustrate implementation of the disclosed LIDAR device in a vehicle 400, specifically illustrating an implementation of the example LIDAR device 200 in the vehicle 400. Although vehicle 400 is illustrated as a car, as discussed above, other embodiments are possible. Furthermore, although the example vehicle 400 is shown as a vehicle that may be configured to operate in autonomous mode, the embodiments described herein are also applicable to vehicles that are not configured to operate autonomously. Thus, the example vehicle 400 is not meant to be limiting.

Figure 4A:
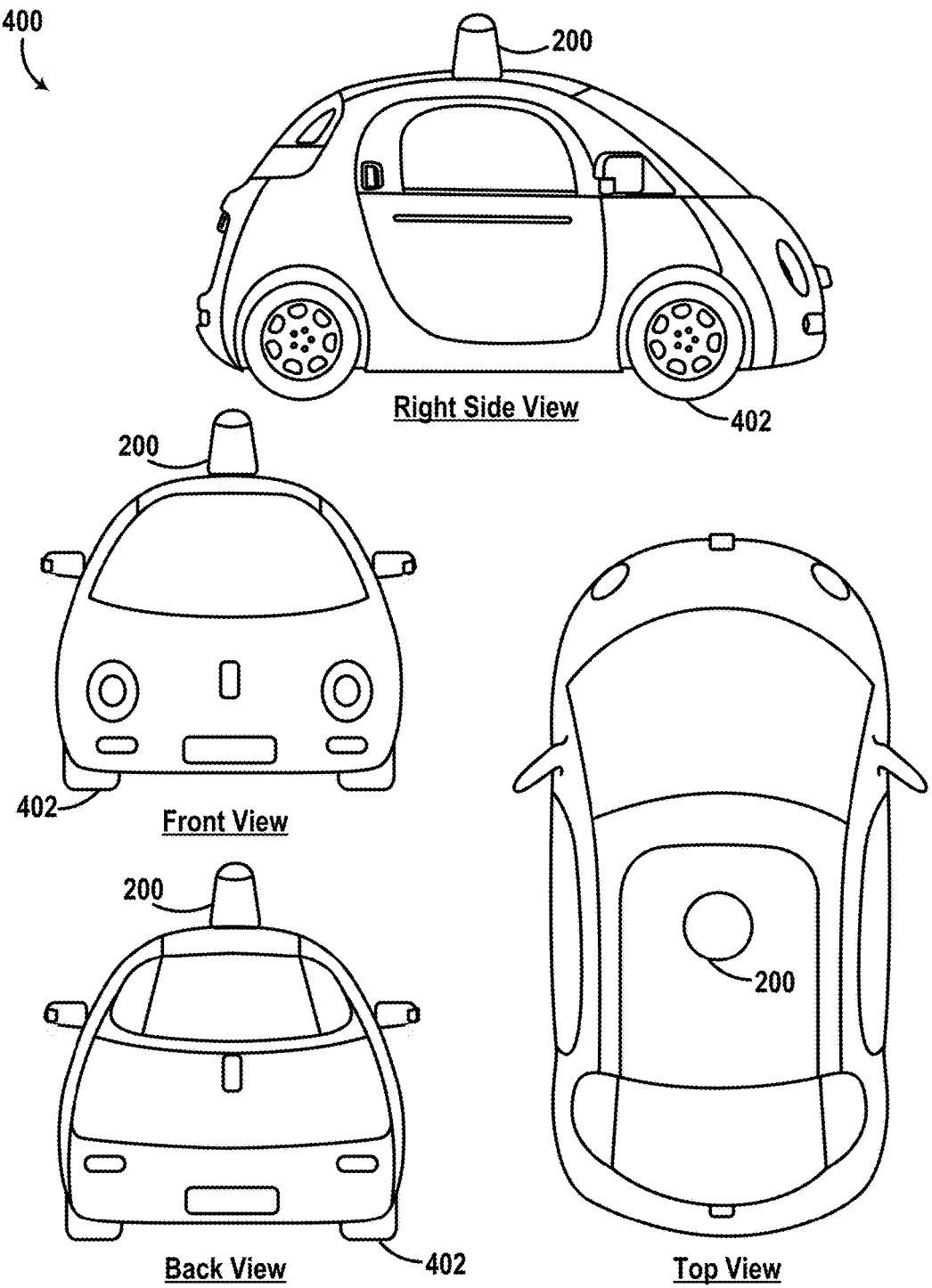
FIG. 4A shows several views of a LIDAR device being positioned on top of a vehicle, according to an example embodiment.

In particular, FIG. 4A shows a Right Side View, Front View, Back View, and Top View of the vehicle 400. As shown, the vehicle 400 includes the LIDAR device 200 being positioned on a top side of the vehicle 400 opposite a bottom side on which wheels 402 of the vehicle 400 are located. Although the LIDAR device 200 is shown and described as being positioned on the top side of the vehicle 400, the LIDAR device 200 could be positioned on any part feasible portion of the vehicle without departing from the scope of the present disclosure.

Figure 4B:
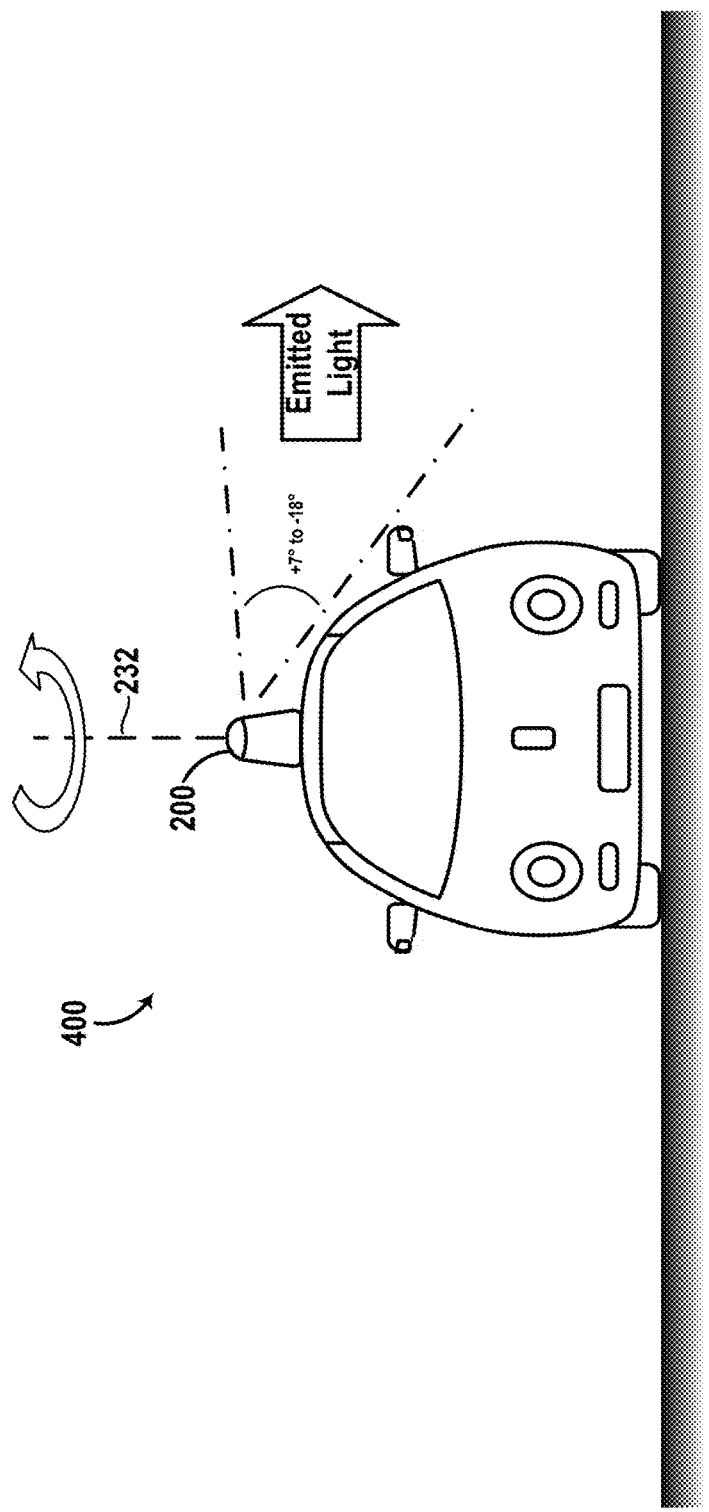
FIG. 4B shows emission of light by a LIDAR device positioned on top of the vehicle, according to an example embodiment.
Figure 4C:
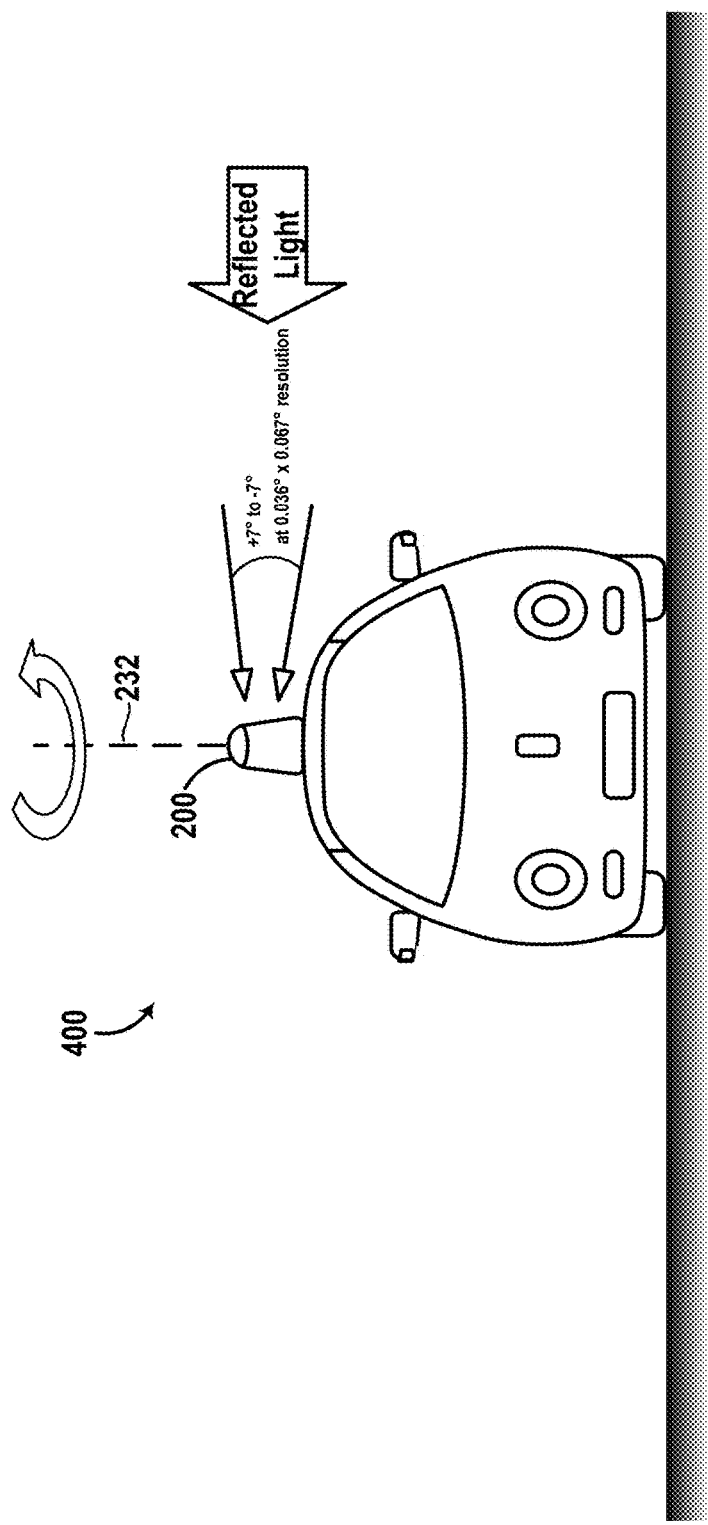
FIG. 4C shows detection of reflected light by a LIDAR device positioned on top of the vehicle, according to an example embodiment.
Figure 4D:
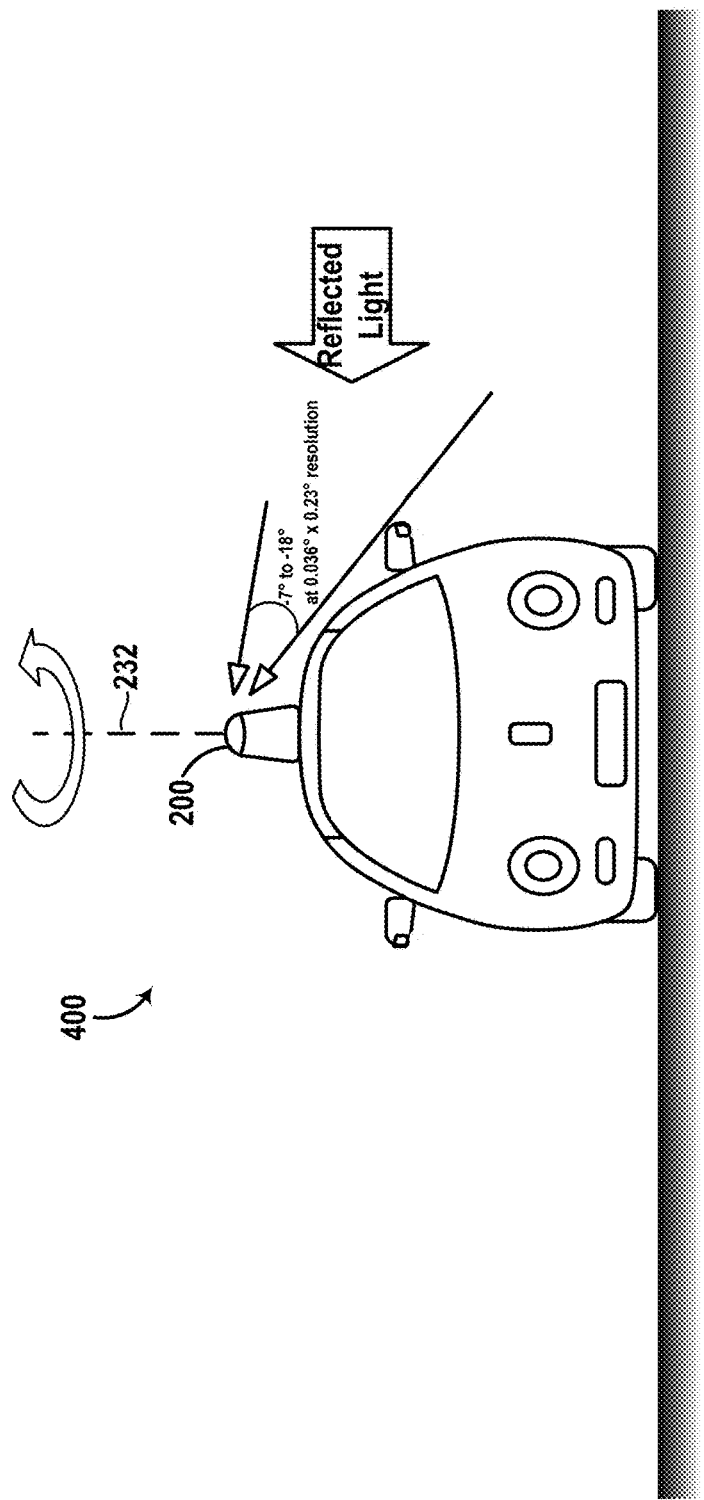
FIG. 4D shows another detection of reflected light by a LIDAR device positioned on top of the vehicle, according to an example embodiment.

Moreover, FIGS. 4B to 4D next show that the LIDAR device 200 may be configured to scan an environment around the vehicle 400 (e.g., at a refresh rate of 15 Hz) by rotating about the vertical axis 232 while emitting one or more light pulses and detecting reflected light pulses off objects in the environment of the vehicle 400, for example.

More specifically, FIG. 4B shows that the LIDAR device 200 emits light with the above-mentioned vertical spread of +7° to −18°. And due to the transmitter 208 being positioned at a higher point as described above (i.e., above the first receiver 210), the LIDAR device 200 could emit light with this vertical spread such that the emissions do not reflect off the vehicle 400 itself. In this way, the light emissions can be emitted toward regions of the environment that are relatively close to the vehicle (e.g., a lane marker) as well as towards regions of the environment that are further away from the vehicle (e.g., a road sign ahead of the vehicle).

Further, FIG. 4C shows that the LIDAR device 200 uses the first receiver 210 to detect reflected light with the above-mentioned vertical FOV of +7° to −7° and do so at a resolution of 0.036°×0.067°. Also, FIG. 4D shows that the LIDAR device 200 uses the second receiver 212 to detect reflected light with the above-mentioned vertical FOV of −7° to −18° and do so at a resolution of 0.036°×0.23°. And due to the second receiver 212 also being positioned at that higher point as described above (i.e., above the first receiver 210) the LIDAR device 200 may use the second receiver 212 to detect light that is reflected off a portion of the environment that is relatively close to the vehicle.

In this way, the first receiver 210 may receive light reflected off objects that are further away from the vehicle 400 and do so at a higher resolution, thereby providing greater detail to help with detection and/or recognition of those further objects. The second receiver 212 may receive light reflected off objects closer to the vehicle 400 and do so at a lower resolution (i.e., compared to the resolution of the first receiver 210), which may provide sufficient detail to help with detection and/or recognition of those closer objects while allowing for reduction in sensor costs, power consumption, and/or data load, among other possibilities.

Figure 4E:
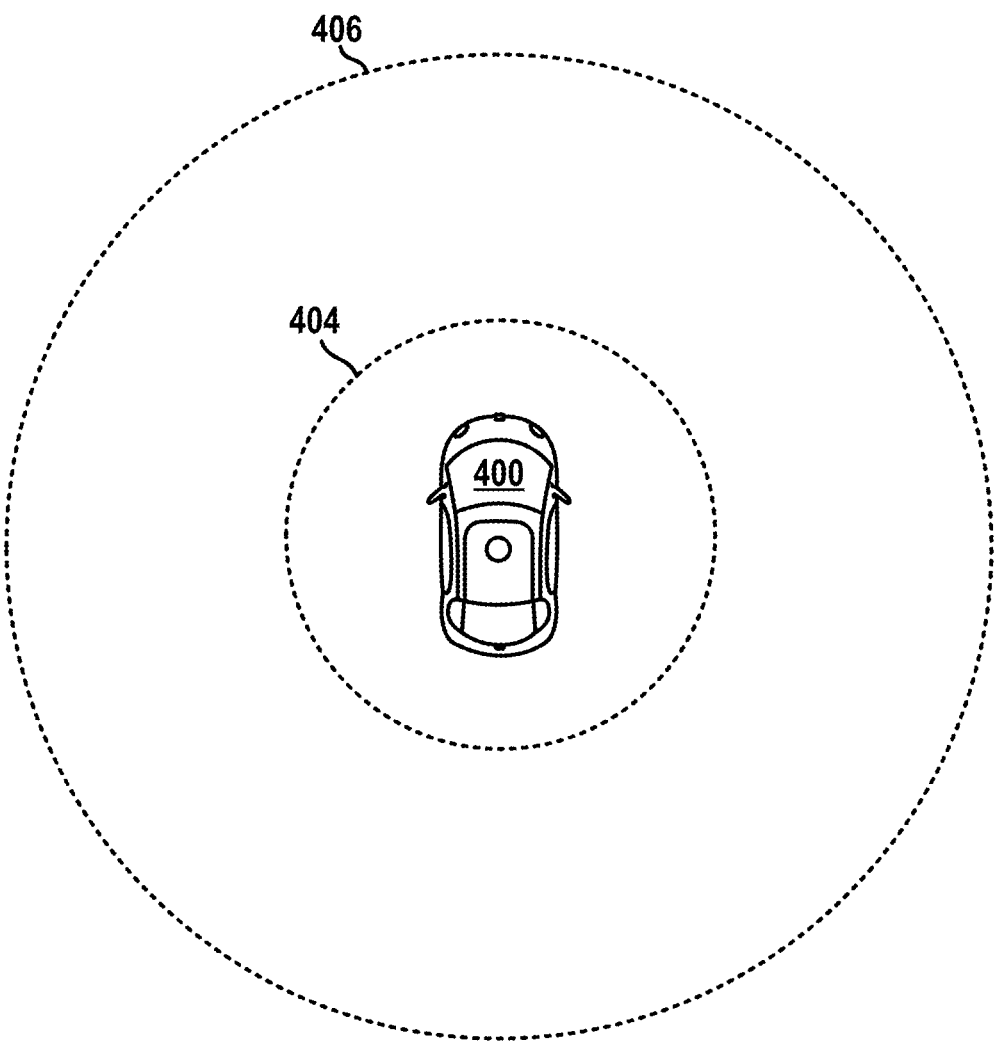
FIG. 4E shows scanning ranges of a LIDAR device positioned on top of the vehicle, according to an example embodiment.

Generally, these different detection distances are illustrated by way of example in FIG. 4E. In particular, FIG. 4E illustrates a top view of the vehicle 400 in the above-described scenario where the vehicle 400 uses the LIDAR device 200 for scanning a surrounding environment. As shown in FIG. 4E, the LIDAR device 200 may be suitable for detection and/or identification of objects within a range of distances to the vehicle 400. These ranges of distances are illustrated by contours 404 and 406. It is noted that these contours are not to scale but are illustrated as shown for convenience of description.

More specifically, objects outside of contour 404 and within a range of distances defined by the contour 406 may be properly detected/identified using the higher resolution data from the first receiver 210 of the LIDAR device 200. Closer objects that are within a range of distances defined by the contour 404 may be properly detected/identified using the lower resolution data from the second receiver 212 of the LIDAR device 200. In either case, the horizontal FOV of each receiver 210-212 may span 360° in all directions around the vehicle 400. Other illustrations are possible as well.

IV. ILLUSTRATIVE METHODS

Figure 5:
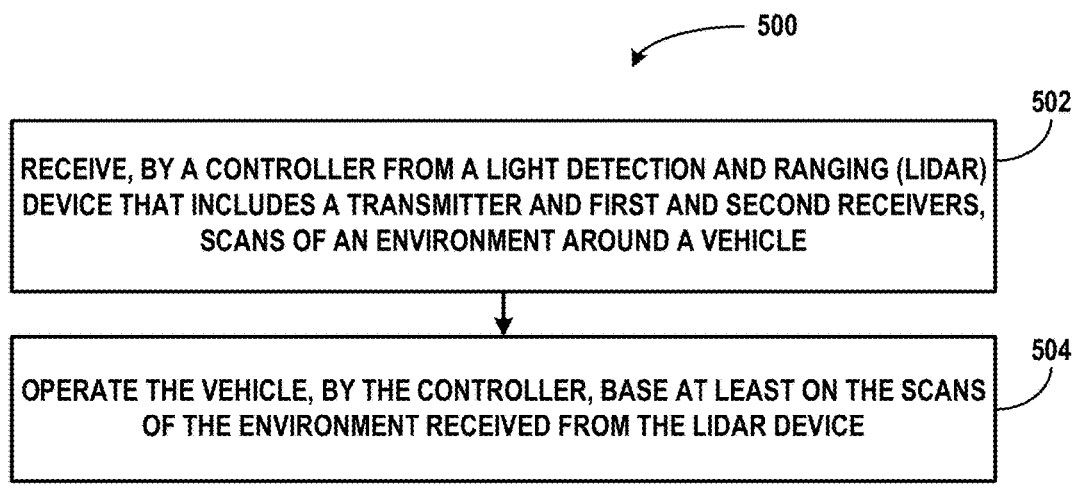
FIG. 5 is a flowchart illustrating a method for operating a vehicle based on scans received from a LIDAR device, according to an example embodiment.

FIG. 5 is a flowchart illustrating a method 500, according to an example implementation. In particular, method 500 may be implemented to operate a vehicle based on scans received from the LIDAR device disclosed herein.

Method 500 shown in FIG. 5 (and other processes and methods disclosed herein) presents a method that can be implemented within an arrangement involving, for example, the LIDAR device 100 of FIG. 1, by vehicle 400 shown in FIGS. 4A-4E, and/or by vehicle 700 shown in FIG. 7 and further described below (or more particularly by one or more components or subsystems thereof, such as by a processor and a non-transitory computer-readable medium having instructions that are executable to cause the device to perform functions described herein). Additionally or alternatively, method 500 may be implemented within any other arrangements and systems.

Method 500 and other processes and methods disclosed herein may include one or more operations, functions, or actions as illustrated by one or more of blocks 502-504. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, method 500 involves receiving, by a controller from a LIDAR device that includes a transmitter and first and second receivers (e.g., LIDAR device 100), scans of an environment around a vehicle.

More specifically, as described above, the controller may operate the LIDAR device 100 to emit light into the environment. Also, the controller may receive from the LIDAR device 100 data representative of detections of reflected light. And by comparing detected light beams with emitted light beams, the controller may determine at least one aspect of one or more objects in the environment.

For example, by comparing a time when a plurality of light beams were emitted by the transmitter of the LIDAR device 100 and a time when one or more of the receivers of the LIDAR device 100 detected reflected light, a distance between the LIDAR device 100 and an object in the environment may be determined. In other examples, aspects such as shape, color, material, etc. may also be determined based on various comparisons between emitted light and detected light.

With this arrangement, the controller could determine a three-dimensional (3D) representation of the environment based on data from the LIDAR device 100. For example, the 3D representation may be generated by a controller as a 3D point cloud based on the data from the LIDAR device 100. Each point of the 3D cloud, for example, may be associated with a reflected light pulse. As such, the controller may (e.g., continuously or from time-to-time) generate 3D representations of the environment or portions thereof.

At block 504, method 500 then involves operating the vehicle, by the controller, based at least on the scans of the environment received from the LIDAR device.

By way of example, the vehicle may be operated in an autonomous mode. In this example, the controller may utilize 3D representations to navigate the vehicle (e.g., adjust speed, direction, etc.) safely by avoiding obstacles among other possibilities. The obstacles or objects, for example, may be detected and/or identified using an image processing algorithm or other computing method to analyze the 3D representations and detect and/or identify the various obstacles or objects. As another example, the vehicle may be operated in a partially autonomous or manual mode. In this example, the vehicle may notify a driver or operator of the vehicle of the presence or distance to various objects or changing road conditions (e.g., street lights, street signs, etc.), such as by causing a display or a speaker in the vehicle to present information regarding one or more objects in the environment. Other examples are possible as well.

Figure 6:
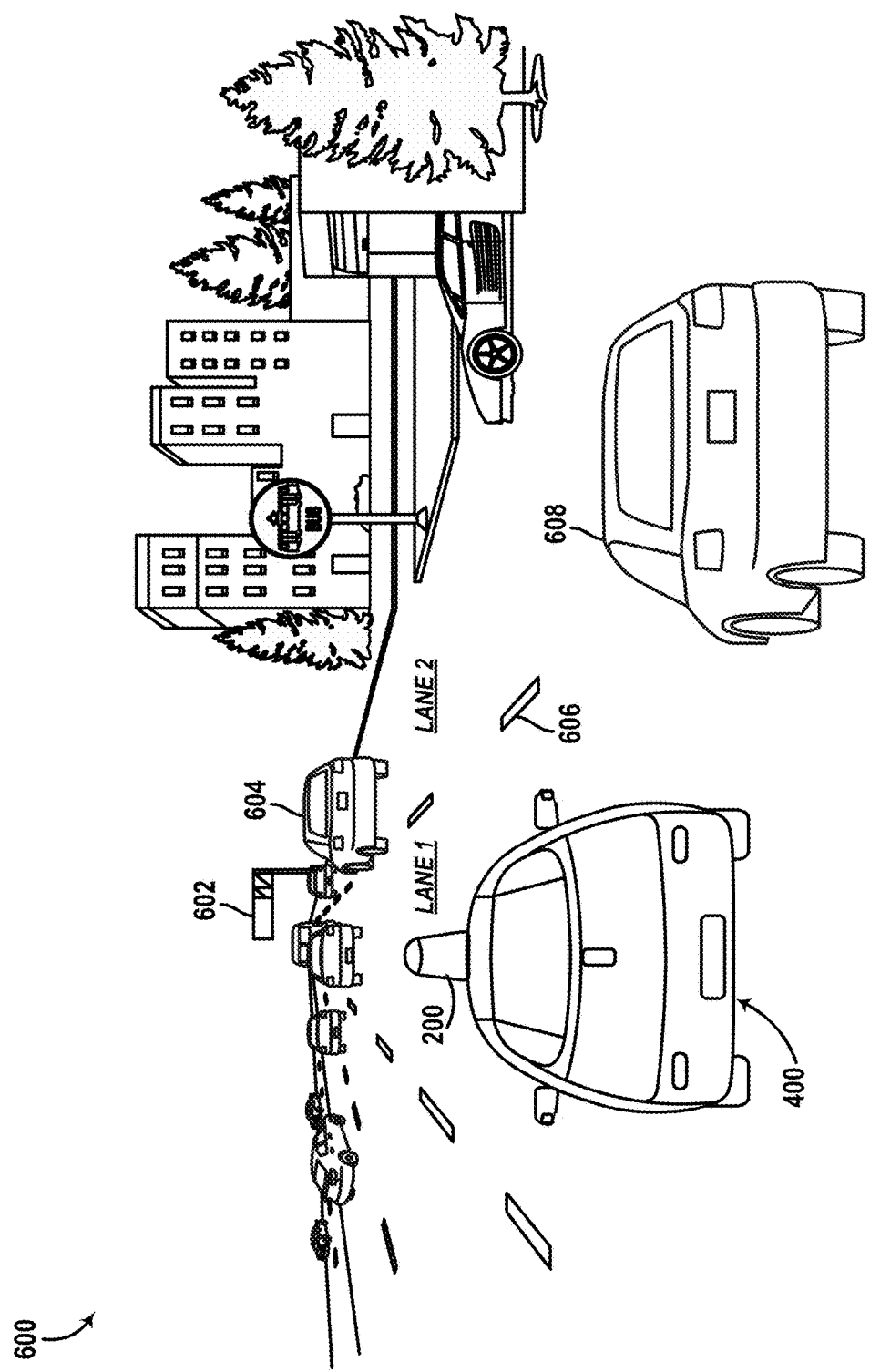
FIG. 6 illustrates operation of a vehicle based on scans of an environment received from a LIDAR device, according to an example embodiment.

FIG. 6 next illustrates example operation of the vehicle 400 based on scans of an environment 600 received from the LIDAR device 200. In accordance with the present disclosure, the vehicle's controller may use data received from the first receiver 210 of the LIDAR device 200 to detect and identify far away object, such as a road sign 602 and a vehicle 604 for example. In this regard, the controller may determine based on the data that the road sign 602 is representative of an exit that the vehicle 400 should ideally take in order to arrive at a desired destination. In response to making that determination, the controller may then operate the vehicle 400 to switch from driving on lane 1 to driving on lane 2.

In practice, the controller may distinguish between these lanes by recognizing lane markers within 3D representations of the environment 600. For instance, the vehicle's controller may use data received from the second receiver 212 of the LIDAR device 200 to detect and identify the nearby lane marker 606 that separates lane 1 from lane 2. Moreover, before operating the vehicle to switch lanes, the controller may scan the environment to detect and identify objects, so that controller can operate the vehicle 400 in a way that avoids those detected/identified object while also operating the vehicle 400 to switch lanes.

For instance, the controller may use data received from the second receiver 212 of the LIDAR device 200 to detect and identify the nearby vehicle 608 and, as noted, may use data received from the first receiver 210 of the LIDAR device 200 to detect and identify the further vehicle 604. Based on those detections/identifications, the controller may operate the vehicle 400 in a way that avoids the vehicles 604 and 608 while also operating the vehicle 400 to switch from driving on lane 1 to driving on lane 2. Other illustrations are possible as well.

V. EXAMPLE ARRANGEMENT OF A VEHICLE

Figure 7:
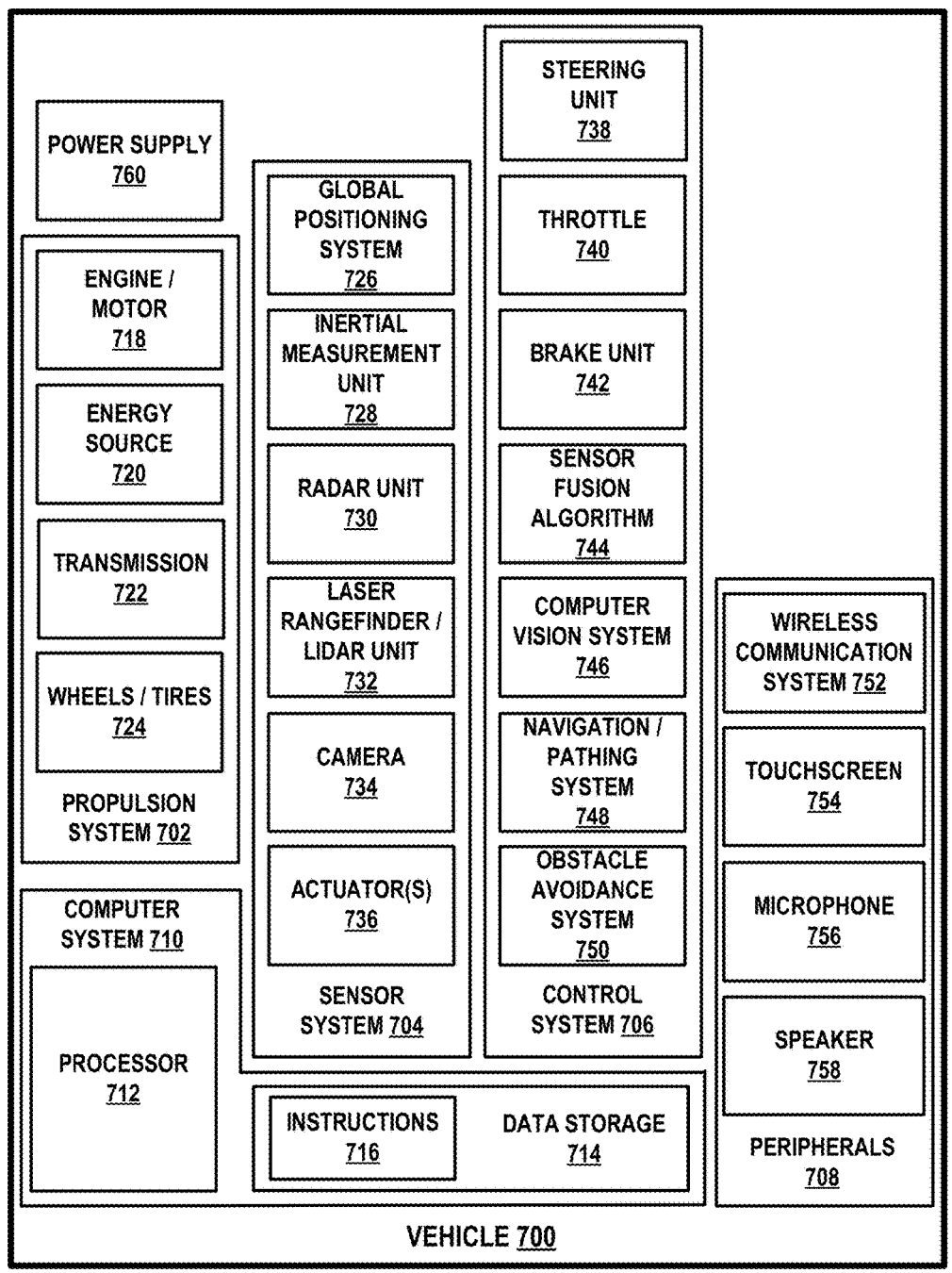
FIG. 7 is a simplified block diagram of a vehicle, according to an example embodiment.

Finally, FIG. 7 is a simplified block diagram of a vehicle 700, according to an example embodiment. The vehicle 700 may be similar to the vehicle 400, and may include a LIDAR device similar to the LIDAR device 100. Further, the vehicle 700 may be configured to perform functions and methods herein such as the method 500. As shown, the vehicle 700 includes a propulsion system 702, a sensor system 704, a control system 706 (could also be referred to as a controller 706), peripherals 708, and a computer system 710. In other embodiments, the vehicle 700 may include more, fewer, or different systems, and each system may include more, fewer, or different components.

Additionally, the systems and components shown may be combined or divided in any number of ways. For instance, the control system 706 and the computer system 710 may be combined into a single system that operates the vehicle 700 in accordance with various operations.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Sterling engine. Other motors and engines are possible as well. In some embodiments, the propulsion system 702 may include multiple types of engines and/or motors. For instance, a gas-electric hybrid car may include a gasoline engine and an electric motor. Other examples are possible.

The energy source 720 may be a source of energy that powers the engine/motor 718 in full or in part. That is, the engine/motor 918 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 may additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts may include one or more axles that are configured to be coupled to the wheels/tires 724.

The wheels/tires 724 of vehicle 700 may be configured in various formats, including a unicycle, bicycle/motorcycle, tricycle, or car/truck four-wheel format. Other wheel/tire formats are possible as well, such as those including six or more wheels. In any case, the wheels/tires 724 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials. The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system 704 include a Global Positioning System (GPS) 726, an inertial measurement unit (IMU) 728, a RADAR unit 730, a laser rangefinder and/or LIDAR unit 732, and a camera 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor (e.g., location sensor) configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR unit 730 may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser range finder or LIDAR unit 732 may be any sensor configured to sense objects in the environment in which the vehicle 700 is located using lasers. For example, LIDAR unit 732 may include one or more LIDAR devices, at least some of which may take the form the LIDAR device 100 disclosed herein.

The camera 734 may be any camera (e.g., a still camera, a video camera, etc.) configured to capture images of the environment in which the vehicle 700 is located. To this end, the camera may take any of the forms described above. The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700. The throttle 740 may be any combination of mechanisms configured to control the operating speed of the engine/motor 718 and, in turn, the speed of the vehicle 700. The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, an algorithm for some of the functions of the methods herein, or any another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the camera 734 in order to identify objects and/or features in the environment in which the vehicle 700 is located, including, for example, traffic signals and obstacles. To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700. The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, the LIDAR unit 732, and one or more predetermined maps so as to determine the driving path for vehicle 700.

The obstacle avoidance system 750 may be any system configured to identify, evaluate, and avoid or otherwise negotiate obstacles in the environment in which the vehicle 700 is located. The control system 706 may additionally or alternatively include components other than those shown.

Peripherals 708 may be configured to allow the vehicle 700 to interact with external sensors, other vehicles, external computing devices, and/or a user. To this end, the peripherals 708 may include, for example, a wireless communication system 752, a touchscreen 754, a microphone 756, and/or a speaker 758.

The wireless communication system 752 may be any system configured to wirelessly couple to one or more other vehicles, sensors, or other entities, either directly or via a communication network. To this end, the wireless communication system 752 may include an antenna and a chipset for communicating with the other vehicles, sensors, servers, or other entities either directly or via a communication network. The chipset or wireless communication system 752 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 752 may take other forms as well.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700. The peripherals 708 may additionally or alternatively include components other than those shown.

The computer system 710 may be configured to transmit data to, receive data from, interact with, and/or control one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

In one example, the computer system 710 may be configured to control operation of the transmission 722 to improve fuel efficiency. As another example, the computer system 710 may be configured to cause the camera 734 to capture images of the environment. As yet another example, the computer system 710 may be configured to store and execute instructions corresponding to the sensor fusion algorithm 744. As still another example, the computer system 710 may be configured to store and execute instructions for determining a 3D representation of the environment around the vehicle 700 using the LIDAR unit 732. Other examples are possible as well. Thus, the computer system 710 could function as the controller for the LIDAR unit 732.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions (e.g., method 500, etc.). Data storage 714 may contain additional instructions as well, including instructions to transmit data to, receive data from, interact with, and/or control one or more of the propulsion system 702, the sensor system 704, the control system 706, and/or the peripherals 708. The computer system 710 may additionally or alternatively include components other than those shown.

As shown, the vehicle 700 further includes a power supply 760, which may be configured to provide power to some or all of the components of the vehicle 700. To this end, the power supply 760 may include, for example, a rechargeable lithium-ion or lead-acid battery. In some embodiments, one or more banks of batteries could be configured to provide electrical power. Other power supply materials and configurations are possible as well. In some embodiments, the power supply 760 and energy source 720 may be implemented together as one component, as in some all-electric cars.

In some embodiments, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections. The vehicle 700 may take other forms as well.

VI. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A light detection and ranging (LIDAR) device comprising:
   a transmitter, wherein the transmitter is configured to emit light having a vertical beam width into an environment, the emitted light having wavelengths in a wavelength range;
   a first receiver, wherein the first receiver is configured to detect light at a first resolution while scanning the environment with a first field of view (FOV), and wherein the first receiver is configured to detect light having wavelengths in the wavelength range;
   a second receiver, wherein the second receiver is configured to detect light at a second resolution while scanning the environment with a second FOV, wherein the second receiver is configured to detect light having wavelengths in the wavelength range, wherein the first resolution is higher than the second resolution, wherein the first FOV is at least partially different from the second FOV, and wherein the vertical beam width encompasses at least a vertical extent of the first and second FOVs; and
   a rotating platform, wherein the rotating platform is configured to rotate about an axis, and wherein the transmitter, the first receiver, and the second receiver are each configured to respectively move relative to the environment based on rotation of the rotating platform.

2. The LIDAR device of claim 1, wherein the transmitter being configured to emit light comprises the transmitter being configured to emit a laser beam having the vertical beam width and having a horizontal beam width, and wherein the horizontal beam width is less than the vertical beam width.

3. The LIDAR device of claim 1, further comprising a stationary platform configured to be coupled to a top side of a vehicle, wherein the top side is opposite to a bottom side on which one or more wheels of the vehicle are positioned.

4. The LIDAR device of claim 3, wherein, when the stationary platform is coupled to the top side of the vehicle, (i) the first receiver is positioned substantially above the stationary platform relative to the top side of the vehicle, (ii) the second receiver and the transmitter are both positioned substantially above the first receiver relative to the top side of the vehicle, and (iii) the second receiver is positioned substantially adjacent to the transmitter relative to the top side of the vehicle.

5. The LIDAR device of claim 3, wherein the stationary platform is coupled to the rotary platform via a rotary link, and wherein the rotating platform being configured to rotate about an axis comprises the rotating platform being configured to, when the stationary platform is coupled to the top side of the vehicle, rotate about a vertical axis that is substantially perpendicular to the top side of the vehicle.

6. The LIDAR device of claim 3, wherein, when the stationary platform is coupled to the top side of the vehicle, the first FOV extends to a first portion of the environment relative to the vehicle and the second FOV extends to a second portion of the environment relative to the vehicle, and wherein the second portion of the environment is substantially closer to the vehicle compared to the first portion of the environment.

7. The LIDAR device of claim 1, wherein the first receiver comprises:
a photodetector array including two or more photodetectors each configured to convert detected light into an electrical signal;
at least one optical lens arranged to focus light from the environment along an optical path to the photodetector array; and
at least one mirror arranged to fold the optical path between the at least one optical lens and the photodetector array.

8. The LIDAR device of claim 7, wherein the at least one mirror being arranged to fold the optical path comprises two or more mirrors being arranged to fold the optical path two or more times between the at least one optical lens and the photodetector array.

9. The LIDAR device of claim 1, wherein the first resolution is a first angular resolution, and wherein the second resolution is a second angular resolution.

10. The LIDAR device of claim 1, further comprising:
a dome-shaped housing coupled to the rotating platform, wherein the dome-shaped housing is configured to rotate about the axis based on rotation of the rotating platform, and wherein the transmitter, the first receiver, and the second receiver are disposed within the dome-shaped housing.

11. The LIDAR device of claim 10,
wherein the dome-shaped housing has an aperture formed thereon,
wherein the transmitter being configured to emit light into the environment comprises the transmitter being configured to emit light into the environment through the aperture,
wherein the first receiver being configured to detect light comprises the first receiver being configured to detect light that enters the dome-shaped housing from the environment through the aperture, and
wherein the second receiver being configured to detect light comprises the second receiver being configured to detect light that enters the dome-shaped housing from the environment through the aperture.

12. The LIDAR device of claim 10, wherein the dome-shaped housing is at least partially composed of a non-transparent material.

13. The LIDAR device of claim 1, further comprising:
a light source configured to generate light, wherein the transmitter being configured to emit light into the environment comprises the transmitter having an optical arrangement that directs light along an optical path from the light source to the environment.

14. The LIDAR device of claim 13, wherein the optical arrangement comprises an optical fiber configured to provide the optical path and a diffuser configured to spread the directed light.

15. The LIDAR device of claim 13, wherein the light source is a fiber laser.

16. The LIDAR device of claim 15, wherein the fiber laser comprises an optical amplifier disposed between the rotating platform and the first receiver.

17. A vehicle comprising:
one or more wheels positioned at a bottom side of the vehicle;
a light detection and ranging (LIDAR) device positioned at a top side of the vehicle opposite to the bottom side,
wherein the LIDAR device comprises a transmitter and first and second receivers,
wherein the transmitter is configured to emit light having a vertical beam width into an environment around the vehicle, the emitted light having wavelengths in a wavelength range,
wherein the first receiver is configured to detect light at a first resolution while scanning the environment with a first field of view (FOV), the detected light having wavelengths in the wavelength range,
wherein the second receiver is configured to detect light at a second resolution while scanning the environment with a second FOV, the detected light having wavelengths in the wavelength range,
wherein the first resolution is higher than the second resolution,
wherein the first FOV is at least partially different from the second FOV, and
wherein the vertical beam width encompasses at least a vertical extent of the first and second FOVs; and
a controller configured to operate the vehicle based at least on scans of the environment by the first and second receivers of the LIDAR device.

18. The vehicle of claim 17,
wherein the LIDAR device further comprises a rotating platform configured to rotate about a vertical axis that is substantially perpendicular to the top side of the vehicle, and
wherein the transmitter, the first receiver, and the second receiver are each configured to respectively move relative to the environment based on rotation of the rotating platform.

19. A method comprising:
receiving, by a controller from a light detection and ranging (LIDAR) device that comprises a transmitter and first and second receivers, scans of an environment around a vehicle,
  wherein the transmitter is configured to emit light having a vertical beam width into the environment, the emitted light having wavelengths in a wavelength range,
  wherein the first receiver is configured to detect light at a first resolution while scanning the environment with a first field of view (FOV), the detected light having wavelengths in the wavelength range,
  wherein the second receiver is configured to detect light at a second resolution while scanning the environment with a second FOV, the detected light having wavelengths in the wavelength range,
  wherein the first resolution is higher than the second resolution,
  wherein the first FOV is at least partially different from the second FOV, and
  wherein the vertical beam width encompasses at least a vertical extent of the first and second FOVs; and
  operating the vehicle, by the controller, based at least on the scans of the environment received from the LIDAR device.

20. The method of claim 19,
  wherein the LIDAR device is positioned at a top side of the vehicle that is opposite to a bottom side on which one or more wheels of the vehicle are positioned,
  wherein the LIDAR device further comprises a rotating platform configured to rotate about a vertical axis that is substantially perpendicular to the top side of the vehicle,
  wherein the transmitter, the first receiver, and the second receiver are each configured to respectively move relative to the environment based on rotation of the rotating platform, and
  wherein an actuator is coupled to the rotating platform,
  the method further comprising:
    while receiving the scans of the environment around the vehicle, directing, by the controller, the actuator to rotate the rotating platform about the vertical axis.

* * * * *